(12) United States Patent
Cho et al.

(10) Patent No.: US 11,933,894 B2
(45) Date of Patent: Mar. 19, 2024

(54) OPTICAL SCANNER AND LIDAR SYSTEM INCLUDING THE SAME

(71) Applicant: SAMSUNG ELECTRONICS CO., LTD., Suwon-si (KR)

(72) Inventors: Yongchul Cho, Suwon-si (KR); Jungwoo Kim, Hwaseong-si (KR); Tatsuhiro Otsuka, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 1256 days.

(21) Appl. No.: 16/237,359

(22) Filed: Dec. 31, 2018

(65) Prior Publication Data

US 2020/0049819 A1 Feb. 13, 2020

(30) Foreign Application Priority Data

Aug. 7, 2018 (KR) .......................... 10-2018-0092045

(51) Int. Cl.
*G01S 17/04* (2020.01)
*G01S 7/481* (2006.01)
(Continued)

(52) U.S. Cl.
CPC ............ *G01S 17/04* (2020.01); *G01S 7/4817* (2013.01); *G01S 17/42* (2013.01); *G02B 5/09* (2013.01);
(Continued)

(58) Field of Classification Search
CPC ........ G01S 17/04; G01S 7/4817; G01S 17/42; G02B 5/09; G02B 26/121; G02B 27/0972
See application file for complete search history.

(56) References Cited

U.S. PATENT DOCUMENTS 3,765,743 A * 10/1973 Reaves .................... H04N 3/09
   348/202
4,795,224 A * 1/1989 Goto .................. G06K 7/10871
   250/236
(Continued)

FOREIGN PATENT DOCUMENTS

EP   0 492 730 A1   7/1992
JP   3802394 B2 *  7/2006
(Continued)

OTHER PUBLICATIONS

Hollows, Gregory et al., Resolution, 2022 (solely used to define term; not used as prior art) (Year: 2022).*

(Continued)

*Primary Examiner* — Yuqing Xiao
*Assistant Examiner* — Brian Zawacki
(74) *Attorney, Agent, or Firm* — Sughrue Mion, PLLC

(57) ABSTRACT

An optical scanner includes at least one light source configured to emit light, a steering unit configured to perform scanning in a first direction based on the light emitted from the at least one light source, and a polygon mirror configured to perform, by using the light output from the steering unit, scanning in a second direction different than the first direction based on a rotation of the polygon mirror. The steering unit includes a plurality of first prisms, and each of the plurality of first prisms includes an incident facet configured to pass the light emitted from the at least one light source, and an output facet configured to refract and output the light. The polygon mirror includes a plurality of reflective facets, and each of the plurality of reflective facets is configured to that reflect the light output from the steering unit.

16 Claims, 26 Drawing Sheets

(51) Int. Cl.
*G01S 17/42* (2006.01)
*G02B 5/09* (2006.01)
*G02B 26/12* (2006.01)
*G02B 27/09* (2006.01)

(52) U.S. Cl.
CPC ....... *G02B 26/121* (2013.01); *G02B 27/0972* (2013.01)

(56) References Cited

U.S. PATENT DOCUMENTS

| | | | |
|---|---|---|---|
| 5,272,325 A | 12/1993 | Peng | |
| 5,570,183 A * | 10/1996 | Wiles | G01B 11/30 356/613 |
| 5,757,472 A * | 5/1998 | Wangler | G01S 7/4817 356/612 |
| 5,864,391 A | 1/1999 | Hosokawa et al. | |
| 7,544,945 B2 | 6/2009 | Tan et al. | |
| 8,174,749 B2 | 5/2012 | Stenton | |
| 10,078,132 B2 * | 9/2018 | Ishikawa | G01S 7/4817 |
| 10,267,619 B2 * | 4/2019 | Tohme | G06T 7/70 |
| 2002/0085081 A1 * | 7/2002 | Tanimoto | H04N 1/506 347/116 |
| 2008/0049288 A1 | 2/2008 | Yun | |
| 2013/0342822 A1 * | 12/2013 | Shiraishi | G01S 17/88 356/4.01 |
| 2014/0240691 A1 * | 8/2014 | Mheen | G01S 17/89 356/4.07 |
| 2017/0146639 A1 | 5/2017 | Carothers | |
| 2019/0204423 A1 * | 7/2019 | O'Keeffe | G01S 17/89 |
| 2019/0212419 A1 * | 7/2019 | Jeong | G01S 17/08 |
| 2021/0364943 A1 * | 11/2021 | Otana | G03G 15/043 |

FOREIGN PATENT DOCUMENTS

| | | |
|---|---|---|
| JP | 2017-32359 A | 2/2017 |
| JP | 2018-28484 A | 2/2018 |
| KR | 10-2008-0017970 A | 2/2008 |
| KR | 10-1687994 B1 | 12/2016 |
| KR | 10-2018-0007228 A1 | 1/2018 |
| WO | 86/01958 A1 | 3/1986 |

OTHER PUBLICATIONS

Birch, Gabriel et al., Pseudo-Random Prism Arrays for Lensless Computational Imagers, 2017 (Year: 2017).*
Machine Translation of EP0192730A1 (Year: 1985).*
Machine Translation of JP2017032359 (Year: 2017).*
Machine Translation of JP2018-28484 (Year: 2018).*
Machine Translation of KR101687994B1 (Year: 2016).*
Machine Translation of JP3802394B2 (Year: 2006).*
PDF of online dictionary entry provided by applicant via link (referred to as "Wikipedia" in action) used solely to establish a definition (i.e. not prior art) (Year: 2023).*
PDF of online dictionary entry provided by applicant via link (referred to as "Dictionary" in action) used solely to establish a definition (i.e. not prior art) (Year: 2023).*
PDF of online dictionary entry provided by applicant via link (referred to as "Definitions" in action) used solely to establish a definition (i.e. not prior art) (Year: 2023).*
Annotated capture of Fig. 3 of Shiraishi (Provided for reference) (Year: 2023).*
Beiser et al., "Chapter 19: Scanners", Handbook of Optics, vol. 2, 1995, 57 pages total.
Communication dated Aug. 8, 2023 issued by the Korean Intellectual Property Office in Korean Application No. 10-2018-0092045.

* cited by examiner

OPTICAL SCANNER AND LIDAR SYSTEM INCLUDING THE SAME

CROSS-REFERENCE TO RELATED APPLICATION

This application claims priority from Korean Patent Application No. 10-2018-0092045, filed on Aug. 7, 2018, in the Korean Intellectual Property Office, the disclosure of which is incorporated herein in its entirety by reference.

BACKGROUND

1. Field

Example embodiments of the present disclosure relate to an optical scanner and a light detection and ranging (LIDAR) system including the optical scanner.

2. Description of the Related Art

Light detection and ranging (LIDAR) relates to a technique of measuring a distance to an object by emitting light onto the object, receiving light reflected from the object, and analyzing the received light. One of the distance measurement methods using LIDAR is a time of flight (TOF) method of obtaining a distance by multiplying a velocity of light by a time taken for the light to travel back and forth between an optical transmitter of LIDAR and an object. The TOF method is largely classified into a mechanical TOF method and a non-mechanical TOF method according to methods of adjusting a traveling direction of light emitted from the optical transmitter to the object.

The mechanical TOF method includes a method capable of securing a wide angle of field by using a rotational force of a motor to rotate a component of the optical transmitter. A method of rotating a component of the optical transmitter includes a method of rotating a reflective mirror, an oscillating mirror method, a scanning method using a photorefractive element, and the like.

This LIDAR system may be applied, for example, to obtain a three-dimensional street image in an advanced driver assistance system (ADAS) of a vehicle or an autonomous vehicle. To obtain high resolution in an autonomous driving stage, 40 or more vertical channels may be necessary.

SUMMARY

One or more example embodiments provide an optical scanner having an increased number of vertical channels and a light detection and ranging (LIDAR) system including the optical scanner.

Additional aspects will be set forth in part in the description which follows and, in part, will be apparent from the description, or may be learned by practice of example embodiments.

According to an aspect of an example embodiment, there is provided an optical scanner including at least one light source configured to emit light, a steering unit configured to perform scanning in a first direction based on the light emitted from the at least one light source, the steering unit including a plurality of first prisms, and each of the plurality of first prisms including an incident facet configured to pass the light emitted from the at least one light source, and an output facet configured to refract and output the light; and a polygon mirror configured to perform, by using the light output from the steering unit, scanning in a second direction different than the first direction based on a rotation of the polygon mirror, the polygon mirror including a plurality of reflective facets, and each of the plurality of reflective facets being configured to that reflect the light output from the steering unit.

The at least one light source may include a laser diode configured to emit a laser beam.

The steering unit may be further configured to change a traveling path of the light emitted from the at least one light source in the first direction based on a rotation of the plurality of first prisms.

The plurality of first prisms may be disposed circularly around a center point of the steering unit.

The optical scanner, wherein at least two of the plurality of first prisms may include output facets having different angles of inclination.

The optical scanner, wherein output facets of first prisms disposed at symmetrical locations with respect to the center point among the plurality of first prisms may have a same angle of inclination.

The steering unit may further include a plurality of second prisms corresponding to the plurality of first prisms, the plurality of second prisms being disposed outside of the plurality of first prisms.

The optical scanner, wherein at least two of the plurality of second prisms may include a plurality of output facets having different angles of inclination.

The optical scanner, wherein second prisms disposed at symmetrical locations with respect to the center point among the plurality of second prisms may have a same angle of inclination.

The optical scanner may further include a reflective member configured to reflect the light output from the steering unit to the polygon mirror.

The second direction may be perpendicular to the first direction.

The plurality of reflective facets may be configured with angles of inclination, respectively, to change a travel path of the light output from the steering unit in the first direction, and the angles of inclination of the plurality of reflective facets, respectively, may be different from each other.

The optical scanner, wherein a minimum angle of inclination of a reflective facet among the plurality of reflective facets may be 0°, and the plurality of reflective facets may be disposed circularly around a center point of the polygon mirror, and an angle of inclination of each of the plurality of reflective facets, respectively, sequentially may increase by a half of a resolution of the at least one light source in a circumferential direction.

The optical scanner may further include a first motor configured to rotate the steering unit around an axis parallel to a traveling direction of the light emitted from the at least one light source, a second motor configured to rotate the polygon mirror around an axis perpendicular to the traveling direction of the light emitted from the at least one light source, and a controller configured to independently drive the at least one light source, and independently drive the first motor and the second motor.

The polygon mirror may include two or more sub-polygon mirrors disposed symmetrically with respect to a plane parallel to the traveling direction of the light emitted from the at least one light source, and a pair of sub-polygon mirrors disposed symmetrically with respect to the plane among the sub-polygon mirrors may have a same shape.

The steering unit may further include a first steering unit and a second steering unit, and the first steering unit and the second steering unit may be disposed at two sides of the polygon mirror, respectively.

According to an aspect of an example embodiment, there is provided a light detection and ranging (LIDAR) system including the optical scanner being configured to scan an object based on light, and a detector configured to receive light reflected from the object.

The LIDAR system, wherein the steering unit may be further configured to change a traveling path of the light emitted from the at least one light source in the first direction based on a rotation of the plurality of first prisms The LIDAR system, wherein the detector may be disposed at a location where the light reflected from the object is directly received.

The LIDAR system, wherein the detector may be disposed at a location where light which is reflected from the object, incident on a reflective facet of the polygon mirror, and reflected from the reflective facet is received, and the reflective facet to which the light reflected from the object is incident may be equal to a reflective facet configured to reflect the light emitted from the at least one light source to the object.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
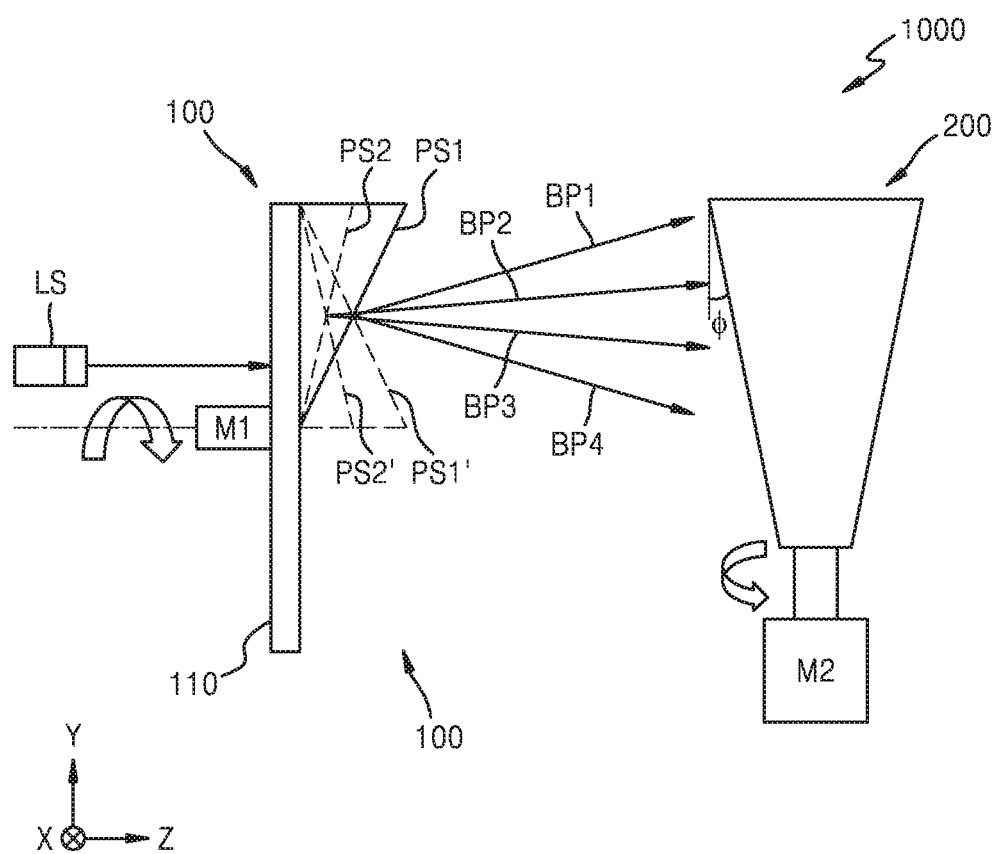
FIG. 1 is a side cross-sectional view of an optical scanner according to an example embodiment.

An optical scanner and a light detection and ranging (LIDAR) system including the same, according to example embodiments, will be described in detail with reference to the accompanying drawings. In the drawings, like reference numerals refer to like elements, and the thickness or size of each component may be exaggerated for clarity of description.

Although terms, such as "first" and "second", can be used to describe various elements, the elements are not limited by the terms. The terms can be used to classify a certain element from another element. An optical scanner and a LIDAR system including the same may be implemented in various different forms and are not limited to example embodiments described below.

Throughout the specification, it will also be understood that when a component "includes" or "comprises" an element, unless there is another opposite description thereto, it should be understood that the component does not exclude another element but may further include another element. It will be further understood that the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Throughout the specification, directions of an X axis, a Y axis, and a Z axis indicating bearings indicate directions perpendicular to each other.

Figure 2:
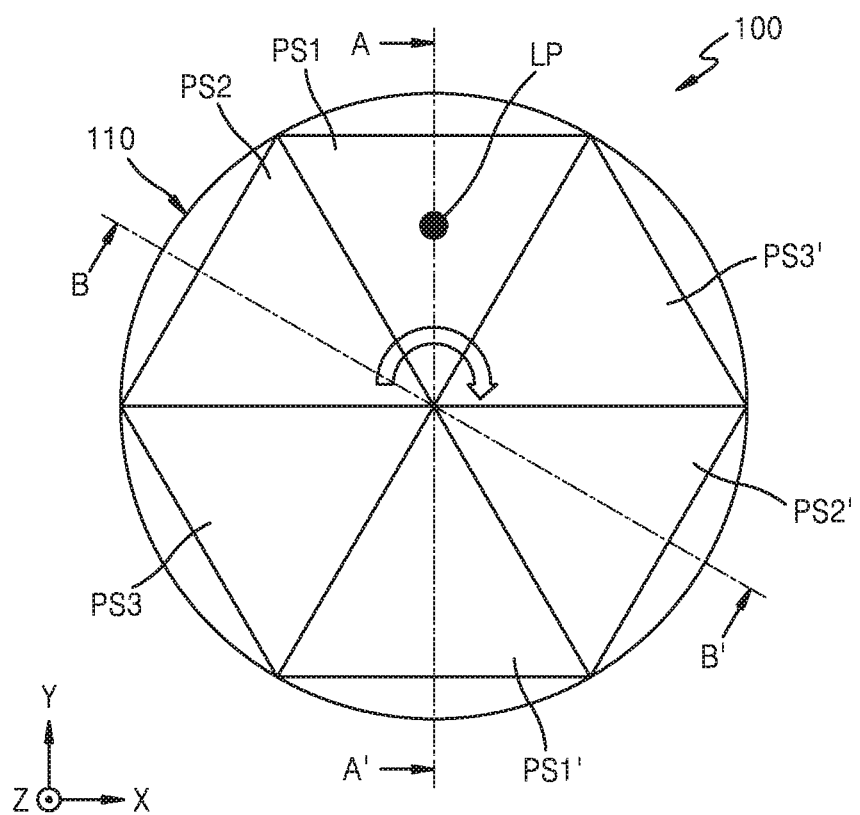
FIG. 2 is a top view of a steering unit which may be included in the optical scanner of FIG. 1, according to an example embodiment.
Figure 3:
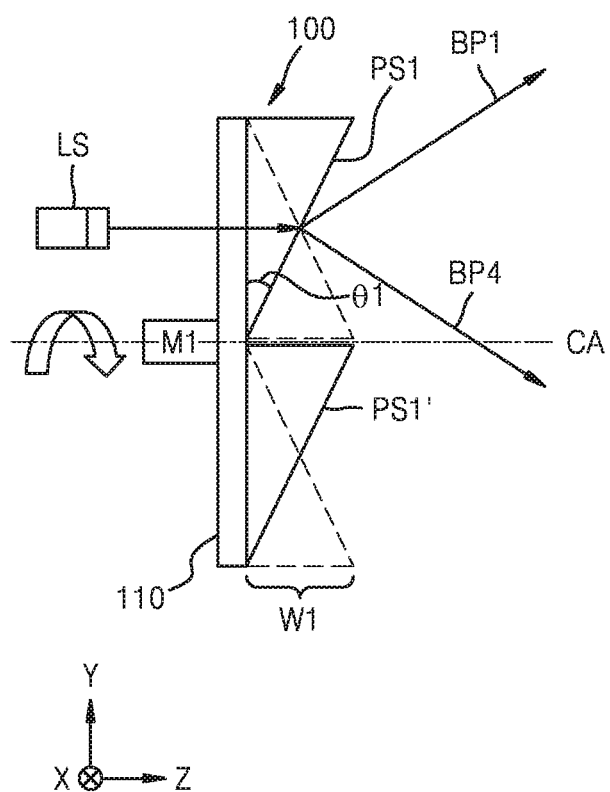
FIG. 3 is a side cross-sectional view taken along line A-A' of the steering unit of FIG. 2, according to an example embodiment.
Figure 4:
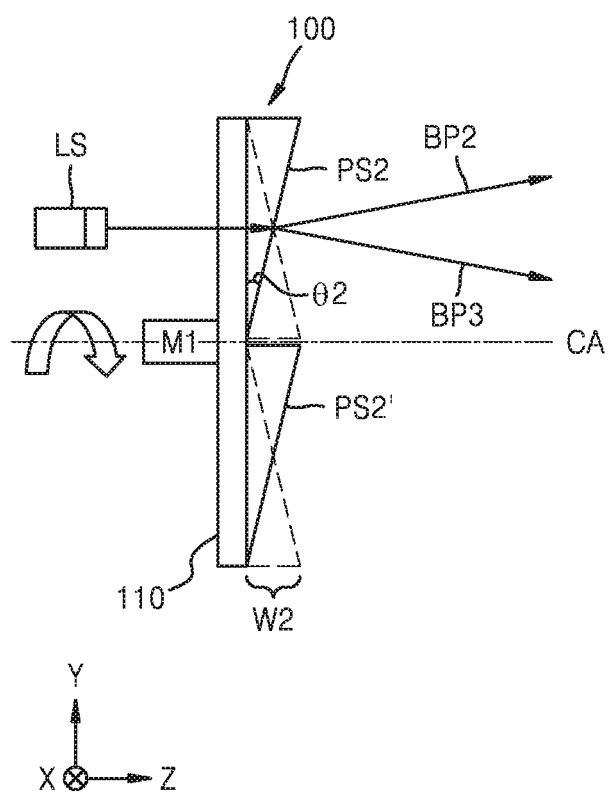
FIG. 4 is a side cross-sectional view taken along line B-B' of the steering unit of FIG. 2, according to an example embodiment.
Figure 5:
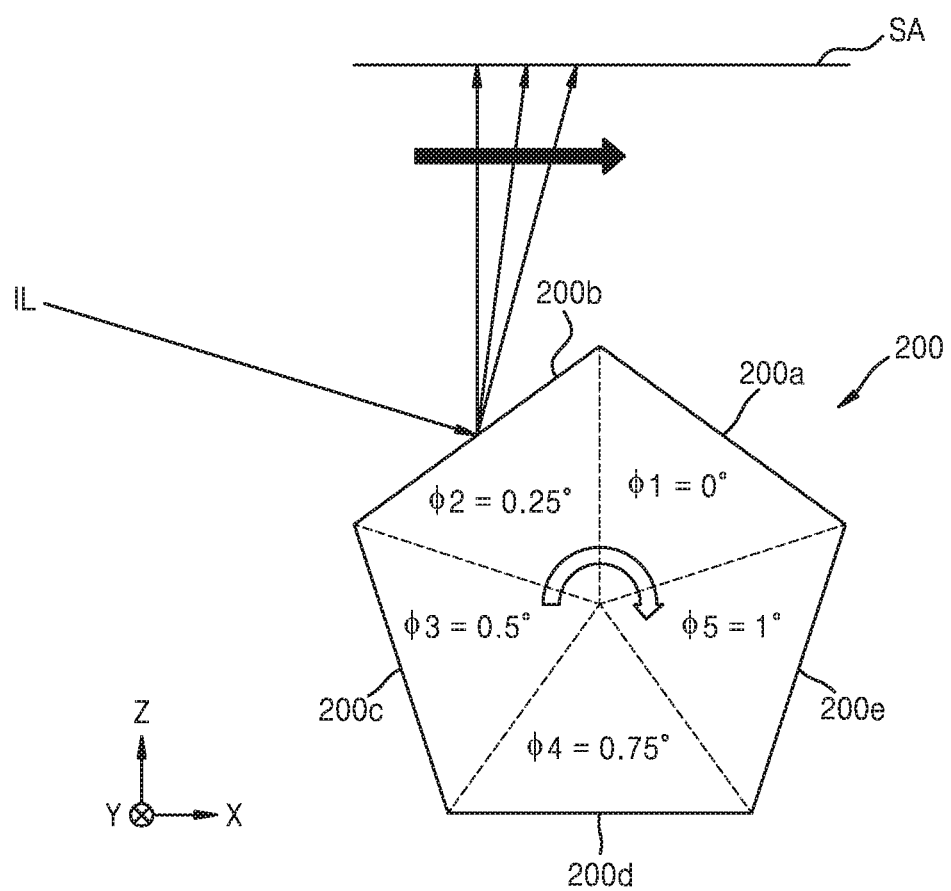
FIG. 5 is a top view of a polygon mirror which may be included in the optical scanner of FIG. 1, according to an example embodiment.

FIG. 1 is a side cross-sectional view of an optical scanner 1000 according to an example embodiment. FIG. 2 is a top view of a steering unit 100 which may be included in the optical scanner 1000 of FIG. 1 according to an example embodiment. FIG. 3 is a side cross-sectional view taken along line A-A' of the steering unit 100 of FIG. 2, according to an example embodiment. FIG. 4 is a side cross-sectional view taken along line B-B' of the steering unit 100 of FIG. 2, according to an example embodiment. FIG. 5 is a top view of a polygon mirror 200 which may be included in the optical scanner 1000 of FIG. 1, according to an example embodiment.

Referring to FIG. 1, the optical scanner 1000 may include at least one light source LS configured to emit light, the steering unit 100 including a plurality of first prisms PS1, PS1', PS2, and PS2' each having an incident facet through which the light emitted from the light source LS is incident and an output facet through which the incident light is refracted and output and a prism wheel 110 to which the plurality of first prisms PS1, PS1', PS2, and PS2' are provided on, and configured to perform scanning in a first direction by using the light, and a polygon mirror 200 having a plurality of reflective facets that reflect the light output from the steering unit 100, and configured to perform, by using the light, scanning in a second direction different from the first direction according to a rotation thereof.

The light source LS may be a laser diode configured to emit laser light. However, the light source LS is not limited thereto, and may be a different light source configured to emit light other than the laser light.

The steering unit 100 may include the plurality of first prisms PS1, PS1', PS2, and PS2' each having an incident facet through which the light emitted from the light source LS is incident and an output facet through which the incident light is refracted and output. The plurality of first prisms PS1, PS1', PS2, and PS2' may be provided on the prism wheel 110. The prism wheel 110 may be electrically connected to a first motor M1 configured to deliver a rotational driving force thereto. Along with rotation of the prism wheel 110 by the first motor M1, the plurality of first prisms PS1, PS1', PS2, and PS2' may also be rotated. An arrangement and a shape of the plurality of first prisms PS1, PS1', PS2, and PS2' will be described below with reference to FIG. 2 according to an example embodiment. FIG. 1 shows, in an overlapped manner, an example where all of the plurality of first prisms PS1, PS1', PS2, and PS2' provided at different locations on the prism wheel 110 are located on a traveling path of light emitted from the light source LS. Although FIG. 1 shows four first prisms PS1, PS1', PS2, and PS2', the number of first prisms is not limited thereto and may be four or more. For example, FIG. 2 shows six first prisms PS1, PS1', PS2, PS2', PS3, and PS3'.

The steering unit 100 may perform scanning in the first direction by using the light, and the first direction may be a Y-axis direction of FIG. 1. For example, a type of the first prism PS1, PS1', PS2, or PS2' located on a traveling path of light emitted from the light source LS may vary according to rotation of the prism wheel 110. When the first prism PS1 is located on the traveling path of the light, the light may pass through the first prism PS1 having an output facet inclined from the traveling path of the light, thereby changing the traveling path of the light to a traveling path BP1. When the first prism PS1' is located on the traveling path of the light, the light may pass through the first prism PS1' having an output facet inclined from the traveling path of the light, thereby changing the traveling path of the light to a traveling path BP4. When the first prism PS2 is located on the traveling path of the light, the light may pass through the first prism PS2 having an output facet inclined from the traveling path of the light, thereby changing the traveling path of the light to a traveling path BP2. When the first prism PS2' is located on the traveling path of the light, the light may pass through the first prism PS2' having an output facet inclined from the traveling path of the light, thereby changing the traveling path of the light to a traveling path BP3.

Along with an increase in the number of first prisms, the number of traveling paths of light output from the first prisms may increase. In addition, along with an increase in the number of traveling paths of light, the number of vertical scan (VS) areas in a light scan area may increase. Although FIG. 1 shows four light traveling paths BP1, BP2, BP3, and BP4, the number of light traveling paths is not limited thereto, and may be four or more. The light may pass through the steering unit 100 and be incident to the polygon mirror 200.

The polygon mirror 200 may include a plurality of reflective facets that reflect the light output from the steering unit 100. The plurality of reflective facets may be inclined at a certain angle $\Phi$ from the Y-axis direction perpendicular to the traveling path of the light emitted from the light source LS which travels in a Z-axis direction, and the plurality of reflective facets of the polygon mirror 200 may reflect the light such that scanning is performed in the first direction. The inclined certain angle $\Phi$ of each of the plurality of reflective facets may vary depending on the reflective facets. Traveling paths of light for scanning in the first direction by the plurality of reflective facets inclined at these different angles $\Phi$ may be different from each other.

The plurality of reflective facets may be arranged circularly around a center point of the polygon mirror 200. The polygon mirror 200 may be rotated around the Y-axis direction as a rotational axis. While the rotation is performed, one arbitrary facet of the plurality of reflective facets may reflect the light to perform scanning in the second direction. The second direction may be an X-axis direction.

As described above, the polygon mirror 200 may reflect light in both the first direction and the second direction to perform scanning.

Referring to FIG. 2, the steering unit 100 may include the plurality of first prisms PS1, PS1', PS2, PS2', PS3, and PS3'. The first prisms PS1, PS1', PS2, PS2', PS3, and PS3' may be wedge prisms each including an incident facet through which light may be incident and an output facet through which the light is refracted and output. Although FIG. 2 shows six first prisms, the number of first prisms is not limited thereto, and may be greater than or less than six. The steering unit 100 may include the prism wheel 110 on which the plurality of first prisms PS1, PS1', PS2, PS2', PS3, and PS3' may be provided. The plurality of first prisms PS1, PS1', PS2, PS2', PS3, and PS3' may be arranged circularly around a center point of the prism wheel 110. The prism wheel 110 may be rotated by a driving force provided by a motor located outside, and according to the rotation, the plurality of first prisms PS1, PS1', PS2, PS2', PS3, and PS3' may be sequentially located on a light point LP. The light point LP may be a point where the light emitted from the light source LS is incident on the steering unit 100.

At least two of the plurality of first prisms PS1, PS1', PS2, PS2', PS3, and PS3' may include output facets having different angles of inclination. For example, angles of inclination of the output facets of the first prisms PS1, PS2, and PS3 may be different from each other. However, an angle of inclination of the output facet of the first prism PS1' provided at a location symmetrical to that of the first prism PS1 with respect to a center point of the steering unit 100 may be the same as an angle of inclination of the output facet of the first prism PS1. In addition, an angle of inclination of the output facet of the first prism PS2' provided at a location symmetrical to that of the first prism PS2 with respect to the center point of the steering unit 100 may be the same as an angle of inclination of the output facet of the first prism PS2. Likewise, an angle of inclination of the output facet of the first prism PS3' provided at a location symmetrical to that of the first prism PS3 with respect to the center point of the steering unit 100 may be the same as an angle of inclination of the output facet of the first prism PS3.

The first prisms PS1, PS2, and PS3 including the output facets having different angles of inclination on the light point LP may be sequentially located according to the rotation of the prism wheel 110. As described above, when the first prisms PS1, PS2, and PS3 having different refractive indices according to the different angles of inclination are sequentially located on the light point LP, the light traveling path may vary according to the rotation of the prism wheel 110. For example, the light traveling direction may vary in the first direction. Therefore, the steering unit 100 may perform scanning in the first direction by using the light. The first direction may be the Y-axis direction.

Referring to FIG. 3, the first prism PS1 provided on the prism wheel 110 at a part taken along line A-A' may be located such that a relatively thick portion W1 is provided at a farther location from the center of the prism wheel 110 than a relatively thin portion. In addition, the first prism PS1' provided on the prism wheel 110 may be located such that a relatively thin portion is provided at a farther location from the center of the prism wheel 110 than the relatively thick portion W1. The first motor M1 configured to deliver a driving force to the prism wheel 110 may be provided on one side facet of the prism wheel 110. Light emitted from the light source LS may be incident to the first prism PS1 and output from an output facet inclined at an angle θ1. An original traveling path of the light may be changed to the traveling path BP1 due to refraction while passing through the output facet of the first prism PS1. When the prism wheel 110 is rotated, around the Z-axis as a rotational axis, by 180° by receiving a driving force from the first motor M1, the first prism PS1' may be located on a traveling path of the light. In this case, the original traveling path of the light may be changed to the traveling path BP4 different from the traveling path BP1 due to refraction while passing through the output facet of the first prism PS1'. The traveling paths BP1 and BP4 may be in directions diverging from the output facets.

Referring to FIG. 4, the first prism PS2 provided on the prism wheel 110 at a part taken along line B-B' may be located such that a relatively thick portion W2 is provided at a farther location from the center of the prism wheel 110 than a relatively thin portion. In addition, the first prism PS2' provided on the prism wheel 110 may be located such that a relatively thin portion is provided at a farther location from the center of the prism wheel 110 than the relatively thick portion W2. The first motor M1 configured to deliver a driving force to the prism wheel 110 may be provided on one side facet of the prism wheel 110. The first prism PS2 may be located on a traveling path of light according to rotation of the first motor M1. Light emitted from the light source LS may be incident to the first prism PS2 and output from an output facet inclined at an angle θ2 that is less than the angle θ1. An original traveling path of the light may be changed to the traveling path BP2 due to refraction while passing through the output facet of the first prism PS2. When the prism wheel 110 is rotated by 180° by receiving a driving force from the first motor M1, the first prism PS2' may be located on a traveling path of the light. In this case, the original traveling path of the light may be changed to the traveling path BP3 different from the traveling path BP2 due to refraction while passing through the output facet of the first prism PS2'. The traveling paths BP2 and BP3 may be in directions diverging from the output facets.

As described above, according to rotation of the plurality of first prisms PS1, PS1', PS2, and PS2' having different angles of inclination of output facets, a traveling path of light emitted from the light source LS and passing through the plurality of first prisms PS1, PS1', PS2, and PS2' may be changed to the traveling path BP1, the traveling path BP2, the traveling path BP3, and the traveling path BP4 in the first direction. The four traveling paths BP1, BP2, BP3, and BP4 of the light may respectively form four VS areas included in an area scanned using the light. The VS areas will be described below with reference to FIG. 10.

Referring to FIG. 5, the polygon mirror 200 may include a plurality of reflective facets 200a, 200b, 200c, 200d, and 200e. The polygon mirror 200 may be rotated around the Y-axis direction as a rotational axis by receiving a driving force from the outside. During the rotation, one arbitrary facet of the plurality of reflective facets 200a, 200b, 200c, 200d, and 200e may reflect light IL incident from the steering unit 100 such that scanning is performed in the second direction. For example, according to the rotation of the polygon mirror 200, an incident angle and a reflective angle of the incident light IL on one arbitrary facet of the plurality of reflective facets 200a, 200b, 200c, 200d, and 200e may be changed such that scanning in a horizontal direction (X-axis direction) is performed. The second direction may be the X-axis direction.

In addition, the five reflective facets 200a, 200b, 200c, 200d, and 200e may respectively have angles of inclination $\Phi1$, $\Phi2$, $\Phi3$, $\Phi4$, and $\Phi5$ such that a traveling path of the light IL incident from the steering unit 100 is changed in the first direction. The angles of inclination $\Phi1$, $\Phi2$, $\Phi3$, $\Phi4$, and $\Phi5$ may indicate angles inclined from the Y-axis direction. The angles of inclination $\Phi1$, $\Phi2$, $\Phi3$, $\Phi4$, and $\Phi5$ of the five reflective facets 200a, 200b, 200c, 200d, and 200e may be different from each other. In addition, a difference between the angles of inclination $\Phi1$, $\Phi2$, $\Phi3$, $\Phi4$, and $\Phi5$ of the five reflective facets 200a, 200b, 200c, 200d, and 200e may have a value of a half of a vertical resolution. For example, when a vertical resolution of the light source LS is 0.5°, the difference between the angles of inclination $\Phi1$, $\Phi2$, $\Phi3$, $\Phi4$, and $\Phi5$ of the five reflective facets 200a, 200b, 200c, 200d, and 200e may be 0.25°. Furthermore, the five reflective facets 200a, 200b, 200c, 200d, and 200e may be arranged circularly around the center point of the polygon mirror 200 such that the angles of inclination $\Phi1$, $\Phi2$, $\Phi3$, $\Phi4$, and $\Phi5$ of the five reflective facets 200a, 200b, 200c, 200d, and 200e sequentially increase in a circumferential direction of the circle. Therefore, as described above, when an angle of inclination of a reflective facet having a minimum angle of inclination among the five reflective facets 200a, 200b, 200c, 200d, and 200e is 0° ($\Phi1$), the other reflective facets may be arranged circularly such that angles of inclination thereof increase in an order of 0.25° (Φ2), 0.5° (Φ3), 0.75° (Φ4), and 1° (Φ5). Although FIG. 5 shows that the angles of inclination Φ1, Φ2, Φ3, Φ4, and Φ5 of the five reflective facets 200a, 200b, 200c, 200d, and 200e increase in a counterclockwise direction, the angles of inclination Φ1, Φ2, Φ3, Φ4, and Φ5 of the five reflective facets 200a, 200b, 200c, 200d, and 200e are not limited thereto, and may increase in a clockwise direction.

A traveling direction of the light IL may be changed to five traveling directions along the first direction by the five reflective facets 200a, 200b, 200c, 200d, and 200e. Five vertical channels in a scan area may be formed by the five traveling directions of the light IL. Although FIG. 5 shows five reflective facets 200a, 200b, 200c, 200d, and 200e, the number of reflective facets is not limited thereto, and may be greater than or less than five. The number of vertical channels in the scan area may vary according to the number of reflective facets having different angles of inclination.

Figure 6:
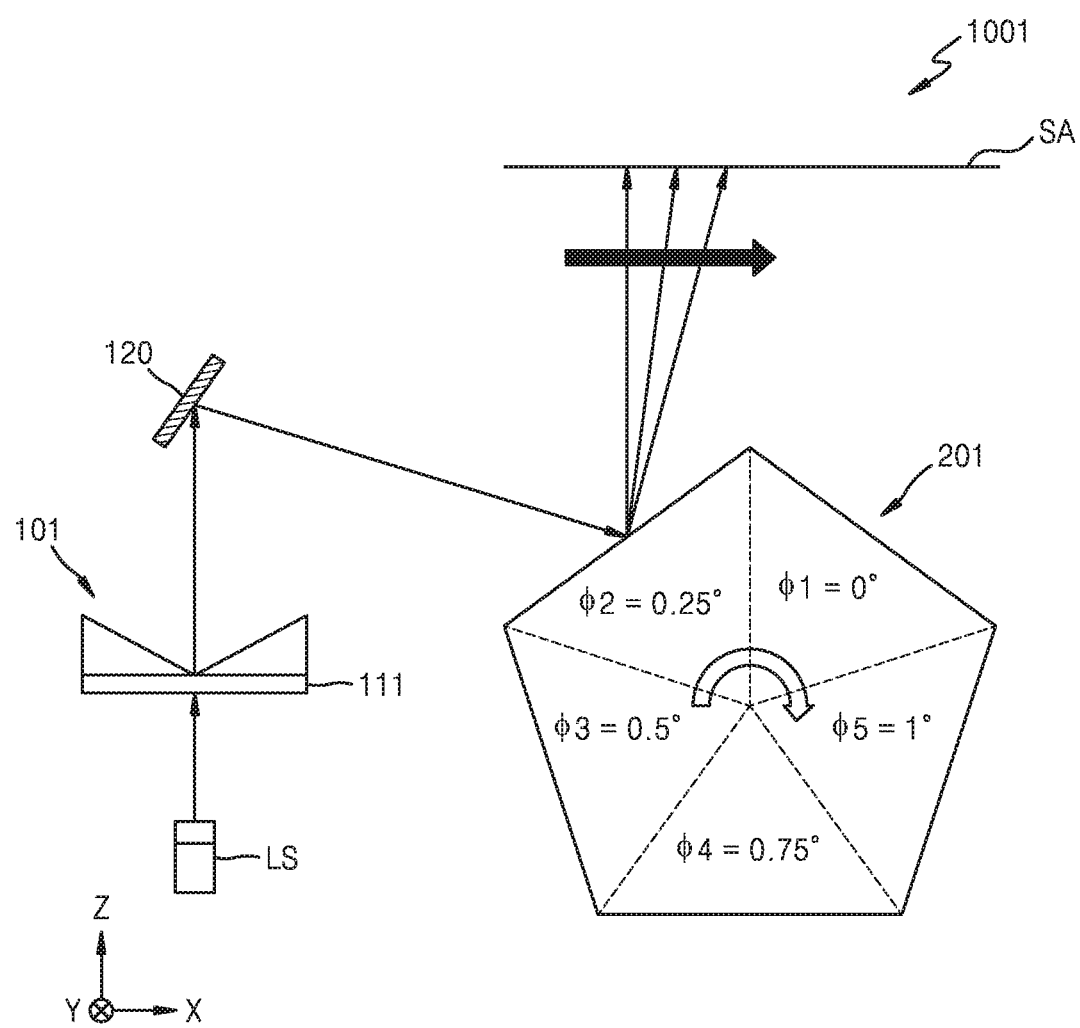
FIG. 6 is top view of an optical scanner according to an example embodiment.

FIG. 6 is a top view of an optical scanner 1001 according to an example embodiment. When a description is made with reference to FIG. 6, a duplicated description of FIG. 1 is not repeated.

Referring to FIG. 6, the optical scanner 1001 may include the at least one light source LS configured to emit light, a steering unit 101 and a polygon mirror 201. The optical scanner 1001 may further include a reflective member 120 configured to reflect light which has passed through the steering unit 101 such that the reflected light travels to the polygon mirror 201. The light passing through the steering unit 101, reflected from the reflective member 120, and traveling to the polygon mirror 201 may be used to perform scanning in the first direction by a plurality of reflective facets of the polygon mirror 201 and in the second direction by rotation of the polygon mirror 201. The rotation of the polygon mirror 201 may be achieved by a second motor configured to deliver a driving force to the polygon mirror 201. For example, when the polygon mirror 201 is rotated by the second motor, an incident angle and a reflective angle of incident light on one arbitrary reflective facet of the plurality of reflective facets may be changed, thereby achieving horizontal scan (HS). The first direction may be the Y-axis direction, and the second direction may be the X-axis direction. Vertical channels in the scan area may be formed by light for scanning in the first direction, and horizontal channels in the scan area may be formed by light for scanning in the second direction. The vertical channels and the horizontal channels will be described below with reference to FIG. 10.

Figure 7:
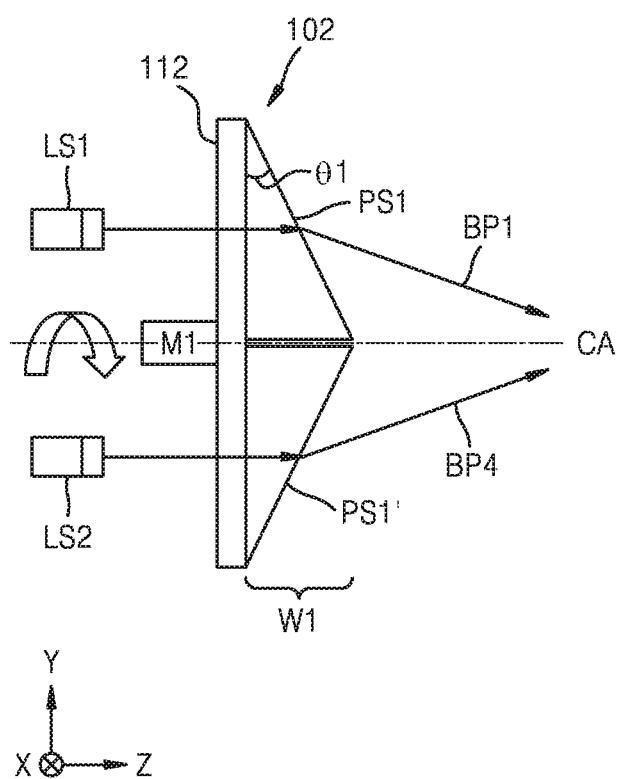
FIG. 7 is a side cross-sectional view taken along line A-A' of the steering unit of FIG. 2, according to an example embodiment.
Figure 8:
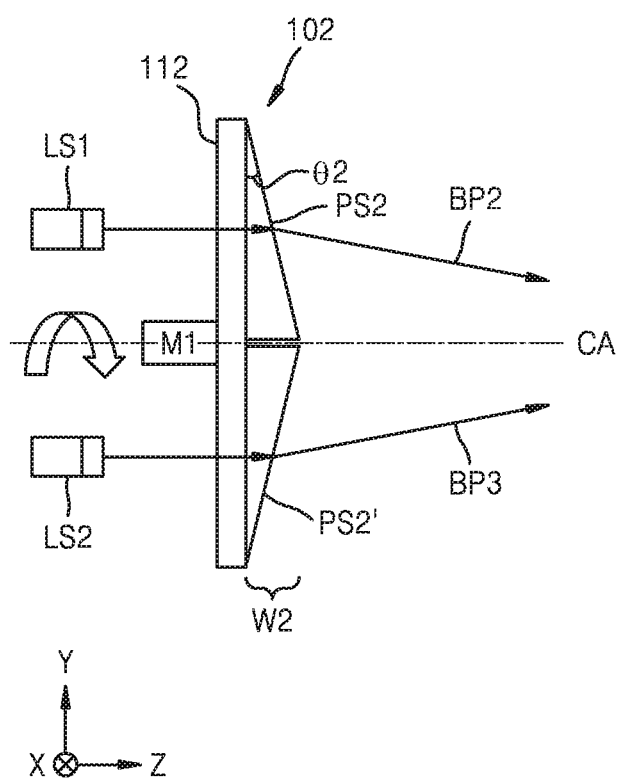
FIG. 8 is a side cross-sectional view taken along line B-B' of the steering unit of FIG. 2, according to an example embodiment.

FIG. 7 is a side cross-sectional view taken along line A-A' of the steering unit 100 of FIG. 2, according to an example embodiment. FIG. 8 is a side cross-sectional view taken along line B-B' of the steering unit 100 of FIG. 2, according to an example embodiment.

Referring to FIG. 7, a first light source LS1 and a second light source LS2 may emit light toward a steering unit 102. The first light source LS1 and the second light source LS2 may be laser diodes configured to emit laser light. However, the first light source LS1 and the second light source LS2 are not limited thereto and may be light sources configured to emit light other than the laser light.

The first prisms PS1 and PS1' provided on a prism wheel 112 at a part taken along line A-A' may include output facets having the angle of inclination θ1 and may be located such that the relatively thick portion W1 is provided at a closer location to the center of the prism wheel 112 than a relatively thin portion. The first motor M1 configured to deliver a driving force to the prism wheel 112 may be provided on one side facet of the prism wheel 112. An original traveling path of light emitted from the first light source LS1 may be changed to the traveling path BP1 due to refraction while passing through the output facet of the first prism PS1, which is inclined at the angle θ1. An original traveling path of light emitted from the second light source LS2 may be changed to the traveling path BP4 different from the traveling path BP1 due to refraction while passing through the output facet of the first prism PS1', which is inclined at the angle θ1. The traveling paths BP1 and BP4 may be in directions converging to any one point on a central axis CA of the steering unit 102.

Referring to FIG. 8, the first prisms PS2 and PS2' provided on the prism wheel 112 at a part taken along line B-B' may include output facets having the angle of inclination θ2 that is less than the angle of inclination θ1 and may be located such that the relatively thick portion W2 is provided at a closer location to the center of the prism wheel 112 than a relatively thin portion. The first motor M1 configured to deliver a driving force to the prism wheel 112 may be provided on one side facet of the prism wheel 112. According to rotation of the first motor M1, the first prisms PS2 and PS2' may be located on a traveling path of light. In this case, lights emitted from the first and second light sources LS1 and LS2 may be respectively output from output facets of the first prisms PS2 and PS2', which are inclined at the angle θ2. Original traveling paths of the lights may be respectively changed to the traveling paths BP2 and BP3 due to refraction while passing through the output facets of the first prisms PS2 and PS2'. The traveling paths BP2 and BP3 may be in directions converging to any one point on the central axis CA of the steering unit 102.

As described above, according to rotation of the prism wheel 112, types of the first prisms PS1, PS1', PS2, and PS2' located on traveling paths of lights emitted from the first and second light sources LS1 and LS2 may be changed. Therefore, a traveling path of light emitted from the light source LS and passing through the first prisms PS1, PS1', PS2, and PS2' may be changed to the traveling paths BP1, BP2, BP3, and BP4 in the first direction. The four light traveling paths BP1, BP2, BP3, and BP4 may form four VS areas included in an area scanned using the light. The VS areas will be described below with reference to FIG. 10.

Although FIGS. 7 and 8 show four first prisms PS1, PS1', PS2, and PS2', the number of first prisms is not limited thereto, and may be greater than four. When the number of first prisms is greater than four, the number of VS areas in the area scanned using the light may increase.

Figure 9:
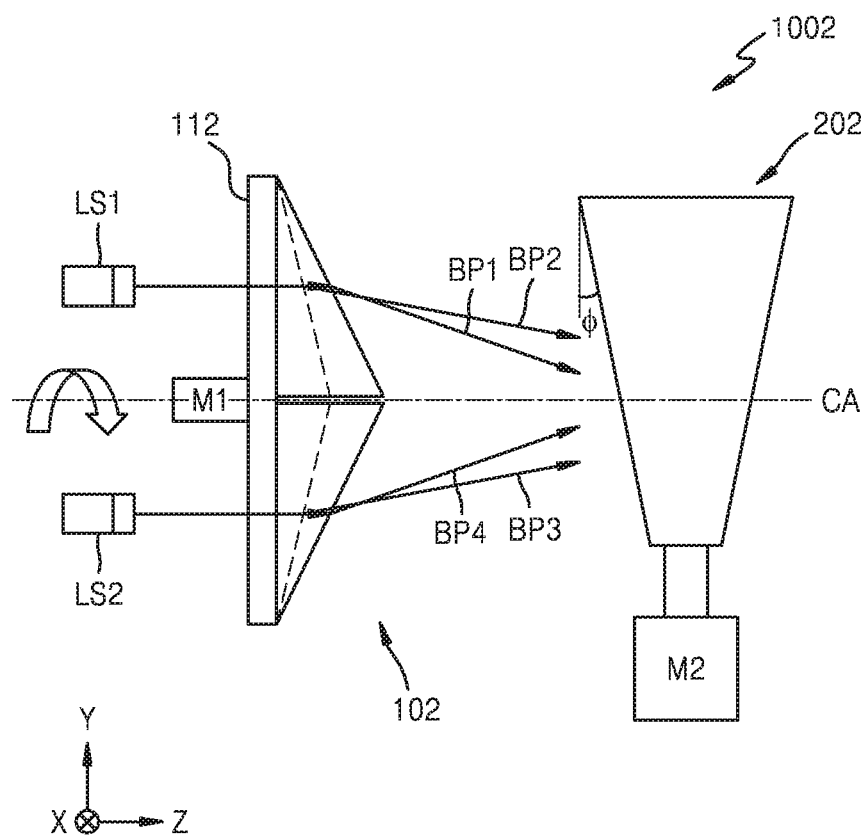
FIG. 9 is a side cross-sectional view of an optical scanner including the steering unit described with reference to FIGS. 7 and 8, according to an example embodiment.

FIG. 9 is a side cross-sectional view of an optical scanner 1002 including the steering unit 102 described with reference to FIGS. 7 and 8, according to an example embodiment.

Referring to FIG. 9, the optical scanner 1002 may include the first light source LS1, the second light source LS2, the steering unit 102, and a polygon mirror 202. The steering unit 102 may include the first motor M1 configured to deliver a driving force thereto. The steering unit 102 may be rotated around a Z axis as a central axis by the first motor M1. The polygon mirror 202 may include the second motor M2 configured to deliver a driving force thereto. The polygon mirror 202 may be rotated around the Y axis as a central axis by the second motor M2.

A traveling path of light emitted from the first light source LS1 may be sequentially changed to the traveling paths BP1 and BP2 while passing through the steering unit 102 rotated by a driving force from the first motor M1. In addition, a traveling path of light emitted from the second light source LS2 may be sequentially changed to the traveling paths BP4 and BP3 while passing through the steering unit 102 rotated by the driving force from the first motor M1. The lights which have passed through the steering unit 102 may be incident to and reflected from the polygon mirror 202 as described in detail with reference to FIG. 5.

The optical scanner 1002 may form a scan area by the various traveling paths BP1, BP2, BP3, and BP4 of light, a plurality of reflective facets having different angles of inclination, which are included in the polygon mirror 202, and rotation of the polygon mirror 202. The scan area will be described below with reference to FIG. 10.

Figure 10:
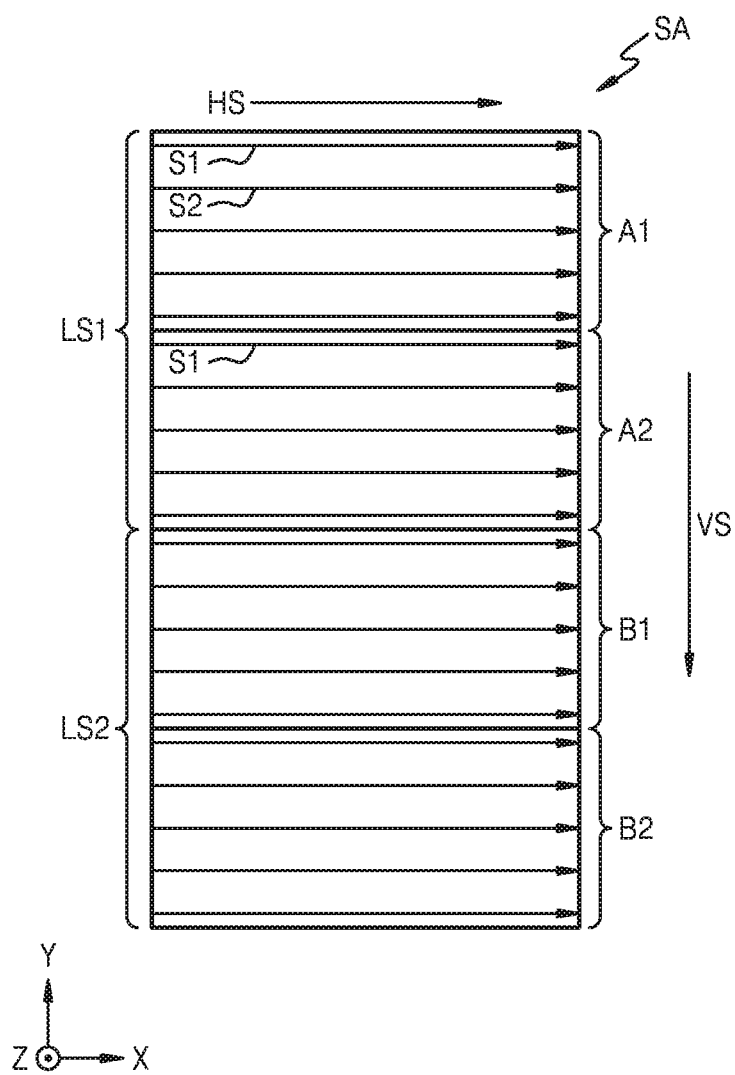
FIG. 10 illustrates a light scan area which may be formed by the optical scanner of FIG. 9.

FIG. 10 illustrates a light scan area which may be formed by the optical scanner 1002 of FIG. 9.

Referring to FIG. 10, the optical scanner 1002 may scan a VS area A1 and a VS area A2 by using light from the first light source LS1. The optical scanner 1002 may scan a VS area B1 and a VS area B2 by using light from the second light source LS2. Although FIG. 10 shows four VS areas A1, A2, B1, and B2, the number of VS areas may increase along with an increase in the number of first prisms.

The VS area A1 may include five vertical channels. For example, the five vertical channels including a first vertical channel S1 and a second vertical channel S2 included in the VS area A1 may be formed by five reflective facets of the polygon mirror 202, respectively. Corresponding vertical channels included in the other VS areas A2, B1, and B2 may also be formed by the five reflective facets of the polygon mirror 202, respectively. As described above, the number of reflective facets of the polygon mirror 202 may be five or more, and thus, the number of vertical channels included in each of the VS areas A1, A2, B1, and B2 may also be five or more.

As such, the number of channels in a VS area may increase according to the number of first prisms and the number of reflective facets of the polygon mirror 202.

As described above, HS may be achieved by rotation of the polygon mirror 202. HS may be a scan achieved in the X-axis direction. For example, when the polygon mirror 202 is rotated by the second motor M2, an incident angle and a reflective angle of incident light on one arbitrary reflective facet of the plurality of reflective facets may be changed, thereby achieving HS.

When the optical scanner 1002 of FIG. 9 is used, light is used to scan the scan area SA including 20 vertical channels. For example, a total of 5×4=20 vertical channels may be formed by five reflective mirrors of the polygon mirror 202 of FIG. 9 and the four light traveling paths BP1, BP2, BP3, and BP4.

Figure 11:
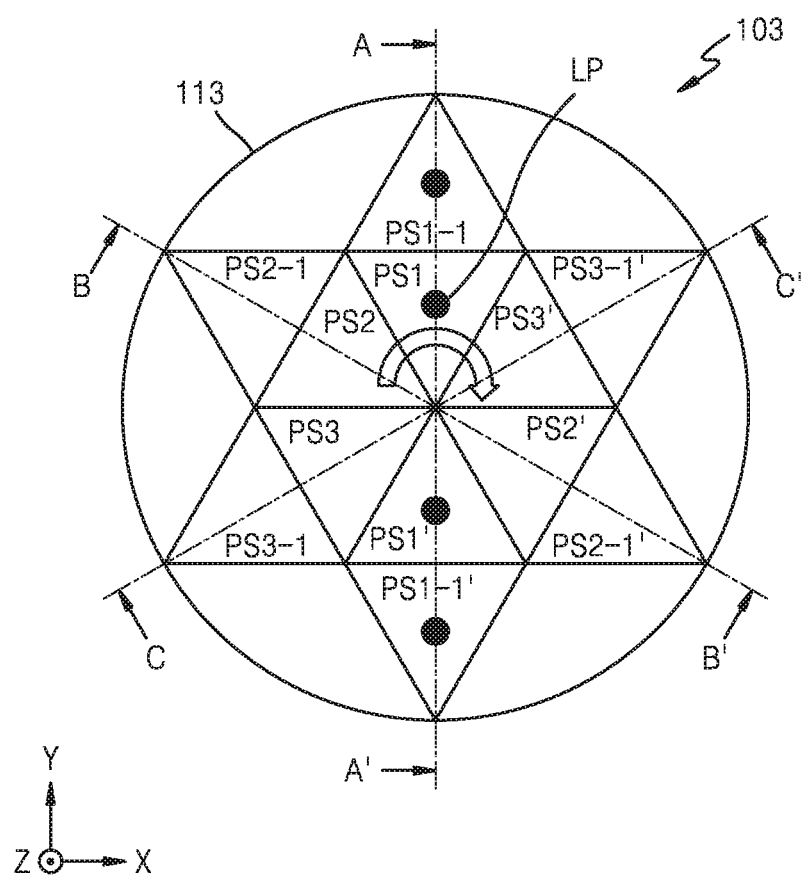
FIG. 11 is a top view of a steering unit which may be included in the optical scanner of FIG. 1, according to an example embodiment.

FIG. 11 is a top view of a steering unit 103 which may be included in the optical scanner 1000 of FIG. 1, according to an example embodiment.

Referring to FIG. 11, the steering unit 103 may have four light points LP through which lights emitted from four light sources pass, respectively.

The steering unit 103 may include the plurality of first prisms PS1, PS1', PS2, PS2', PS3, and PS3'. The first prisms PS1, PS1', PS2, PS2', PS3, and PS3' may be wedge prisms each having an incident facet through which light may be incident and an output facet through which the light is refracted and output. Although FIG. 11 shows six first prisms PS1, PS1', PS2, PS2', PS3, and PS3', the number of first prisms is not limited thereto, and may be greater than or less than six. The steering unit 103 may include a prism wheel 113 on which the plurality of first prisms PS1, PS1', PS2, PS2', PS3, and PS3' may be provided. The plurality of first prisms PS1, PS1', PS2, PS2', PS3, and PS3' may be arranged circularly around a central point of the prism wheel 113. The prism wheel 113 may be rotated by receiving a driving force from the outside, and according to the rotation, a pair of the first prisms PS1 and PS1', a pair of the first prisms PS2 and PS2', and a pair of the first prisms PS3 and PS3' may be sequentially located on the light points LP.

At least two of the plurality of first prisms PS1, PS1', PS2, PS2', PS3, and PS3' may include output facets having different angles of inclination. For example, angles of inclination of the output facets of the first prisms PS1, PS2, and PS3 may be different from each other. However, an angle of inclination of the output facet of the first prism PS1' provided at a location symmetrical to that of the first prism PS1 with respect to a center point of the steering unit 103 may be the same as an angle of inclination of the output facet of the first prism PS1. In addition, an angle of inclination of the output facet of the first prism PS2' provided at a location symmetrical to that of the first prism PS2 with respect to the center point of the steering unit 103 may be the same as an angle of inclination of the output facet of the first prism PS2. Likewise, an angle of inclination of the output facet of the first prism PS3' provided at a location symmetrical to that of the first prism PS3 with respect to the center point of the steering unit 103 may be the same as an angle of inclination of the output facet of the first prism PS3.

In addition, the steering unit 103 may further include a plurality of second prisms PS1-1, PS1-1', PS2-1, PS2-1', PS3-1, and PS3-1' arranged outside of, and farther away from the center of the steering unit 103, the plurality of first prisms PS1, PS1', PS2, PS2', PS3, and PS3' such that the plurality of second prisms PS1-1, PS1-1', PS2-1, PS2-1', PS3-1, and PS3-1' respectively correspond to the plurality of first prisms PS1, PS1', PS2, PS2', PS3, and PS3'. The second prisms PS1-1, PS1-1', PS2-1, PS2-1', PS3-1, and PS3-1' may be wedge prisms each having an incident facet through which light may be incident and an output facet through which the light is refracted and output. Although FIG. 11 shows six second prisms PS1-1, PS1-1', PS2-1, PS2-1', PS3-1, and PS3-1', the number of second prisms is not limited thereto, and may be greater than or less than six. The prism wheel 113 may be rotated by receiving a driving force from a motor located outside, and according to the rotation, a pair of the second prisms PS1-1 and PS1-1', a pair of the second prisms PS2-1 and PS2-1', and a pair of the second prisms PS3-1 and PS3-1' may be sequentially located on the light points LP.

At least two of the plurality of second prisms PS1-1, PS1-1', PS2-1, PS2-1', PS3-1, and PS3-1' may include output facets having different angles of inclination. For example, angles of inclination of the output facets of the second prisms PS1-1, PS2-1, and PS3-1 may be different from each other. However, an angle of inclination of the output facet of the second prism PS1-1' provided at a location symmetrical to that of the second prism PS1-1 with respect to the center point of the steering unit 103 may be the same as an angle of inclination of the output facet of the second prism PS1-1. In addition, an angle of inclination of the output facet of the second prism PS2-1' provided at a location symmetrical to that of the second prism PS2-1 with respect to the center point of the steering unit 103 may be the same as an angle of inclination of the output facet of the second prism PS2-1. Likewise, an angle of inclination of the output facet of the second prism PS3-1' provided at a location symmetrical to that of the second prism PS3-1 with respect to the center point of the steering unit 103 may be the same as an angle of inclination of the output facet of the second prism PS3-1.

Figure 12:
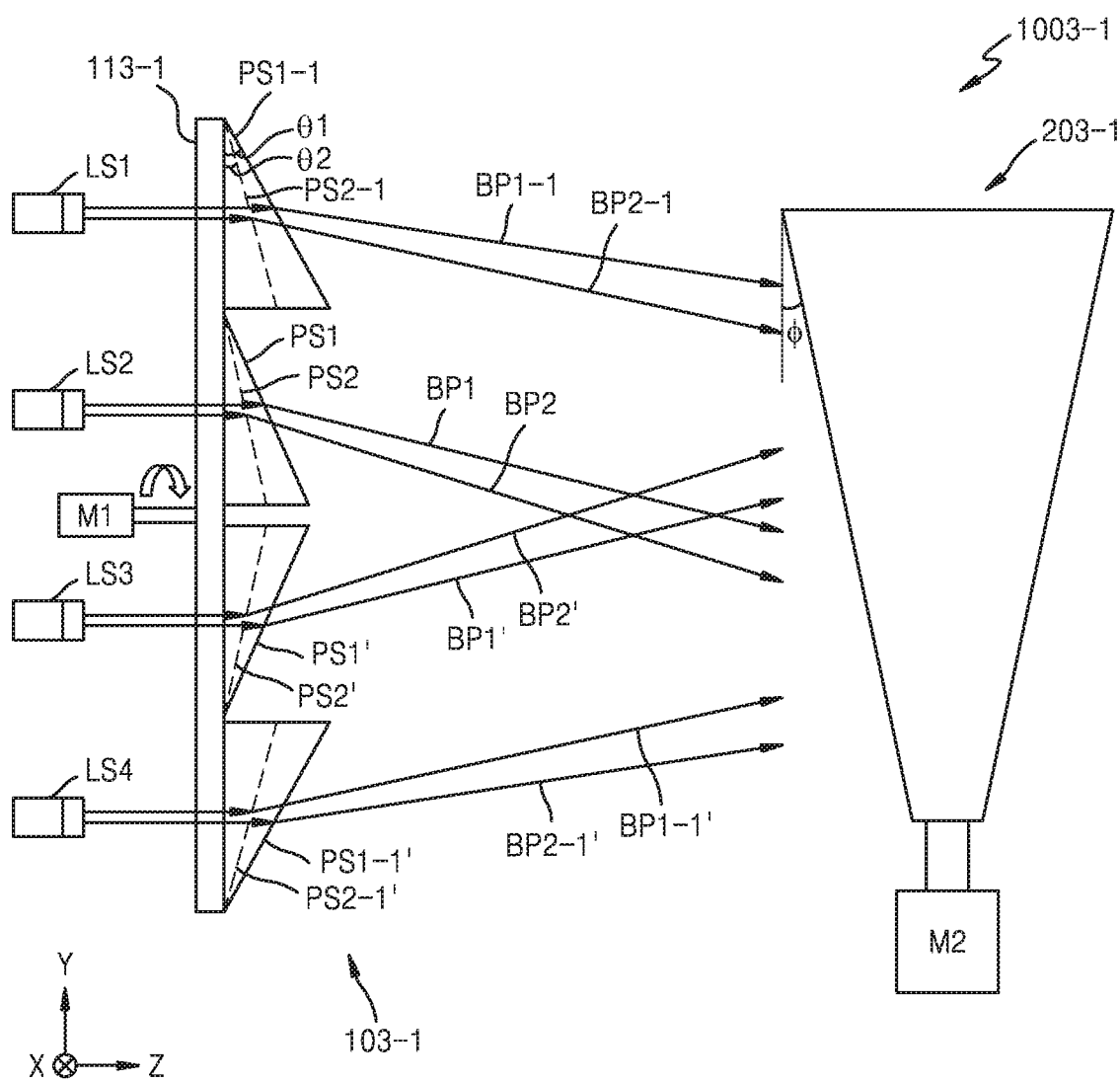
FIG. 12 is a side cross-sectional view of an optical scanner configured to perform optical scanning by using a part A-A' and a part B-B' of the steering unit of FIG. 11, according to an example embodiment.

FIG. 12 is a side cross-sectional view of an optical scanner 1003-1 configured to perform optical scanning by using a part A-A' and a part B-B' of the steering unit 103 of FIG. 11, according to another embodiment.

Referring to FIG. 12, the optical scanner 1003-1 may include the first light source LS1, the second light source LS2, a third light source LS3, a fourth light source LS4, a steering unit 103-1, and a polygon mirror 203-1. In addition, the steering unit 103-1 and the polygon mirror 203-1 may further include the first motor M1 and the second motor M2 configured to deliver a rotational driving force thereto, respectively.

The first light source LS1, the second light source LS2, the third light source LS3, and the fourth light source LS4 may include a laser diode configured to emit laser light. However, the first to fourth light sources LS1 to LS4 are not limited to the laser diode, and may include a different light source configured to emit light other than the laser light.

The part A-A' of the steering unit 103-1 may include a plurality of first prisms PS1 and PS1' and a plurality of second prisms PS1-1 and PS1-1'. In addition, the part B-B' of the steering unit 103-1 may include a plurality of first prisms PS2 and PS2' and a plurality of second prisms PS2-1 and PS2-1'. FIG. 12 shows, in an overlapped manner, an example where the plurality of first prisms PS1 and PS1' and the plurality of second prisms PS1-1 and PS1-1' along A-A' are located on traveling paths of lights emitted from the first to fourth light sources LS1 to LS4 and a case where the plurality of first prisms PS2 and PS2' and the plurality of second prisms PS2-1 and PS2-1' along B-B' are located on traveling paths of lights emitted from the first to fourth light sources LS1 to LS4 (shown as dashed line).

Along A-A' and the part B-B' of the steering unit 103-1, the plurality of first prisms PS1, PS1', PS2, and PS2' and the plurality of second prisms PS1-1, PS1-1', PS2-1, and PS2-1' provided on a prism wheel 113-1 may be arranged such that a relatively thick portion is located closer to a center point of the steering unit 103-1 than a relatively thin portion.

The angle of inclination $\theta 1$ of the output facet of the second prism PS1-1 may differ from the angle of inclination $\theta 2$ of the output facet of the second prism PS2-1. For example, the angle of inclination $\theta 1$ of the output facet of the second prism PS1-1 may be greater than the angle of inclination $\theta 2$ of the output facet of the second prism PS2-1.

A traveling path of light emitted from the first light source LS1 may be changed to a traveling path BP1-1 while passing through the second prism PS1-1 when the second prism PS1-1 is located on the traveling path of the light before the steering unit 103-1 is rotated. In addition, a traveling path of light emitted from the first light source LS1 may be changed to a traveling path BP2-1 different from the traveling path BP1-1 while passing through the second prism PS2-1 when the second prism PS2-1 is located on the traveling path of the light according to rotation of the steering unit 103-1.

Similar to the first light source LS1, a traveling path of light emitted from the second light source LS2 may be changed to the traveling path BP1 and the traveling path BP2 in response to location changes according to rotation of the first prism PS1 and the first prism PS2 including output facets having different angles of inclination, respectively.

Similar to the first light source LS1, a traveling path of light emitted from the third light source LS3 may be changed to a traveling path BP1' and a traveling path BP2' in response to location changes according to rotation of the first prism PS1' and the first prism PS2' including output facets having different angles of inclination, respectively.

Similar to the first light source LS1, a traveling path of light emitted from the fourth light source LS4 may be changed to a traveling path BP1-1' and a traveling path BP2-1' in response to location changes according to rotation of the second prism PS1-1' and the second prism PS2-1' including output facets having different angles of inclination, respectively.

As described above, a traveling path of light may be changed to the eight traveling paths BP1, BP1', BP2, BP2', BP1-1, BP1-1' BP2-1, and BP2-1' by the four first prisms PS1, PS1', PS2, and PS2' and the four second prisms PS1-1, PS1-1', PS2-1, and PS2-1' which may be included in the steering unit 103-1. Eight VS areas may be formed by the eight traveling paths BP1, BP1', BP2, BP2', BP1-1, BP1-1' BP2-1, and BP2-1' of the light. Although FIG. 12 shows eight prisms, the number of prisms is not limited to eight and may be greater than eight. In this case, the number of VS areas may increase.

The light which has passed through the steering unit 103-1 may be reflected from the polygon mirror 203-1 and used to perform scanning in the first and second directions. The first direction may be the Y-axis direction, and the second direction may be the X-axis direction.

The principle of using the light for scanning by the polygon mirror 203-1 has been described above, and thus, a description thereof is not repeated.

Figure 13:
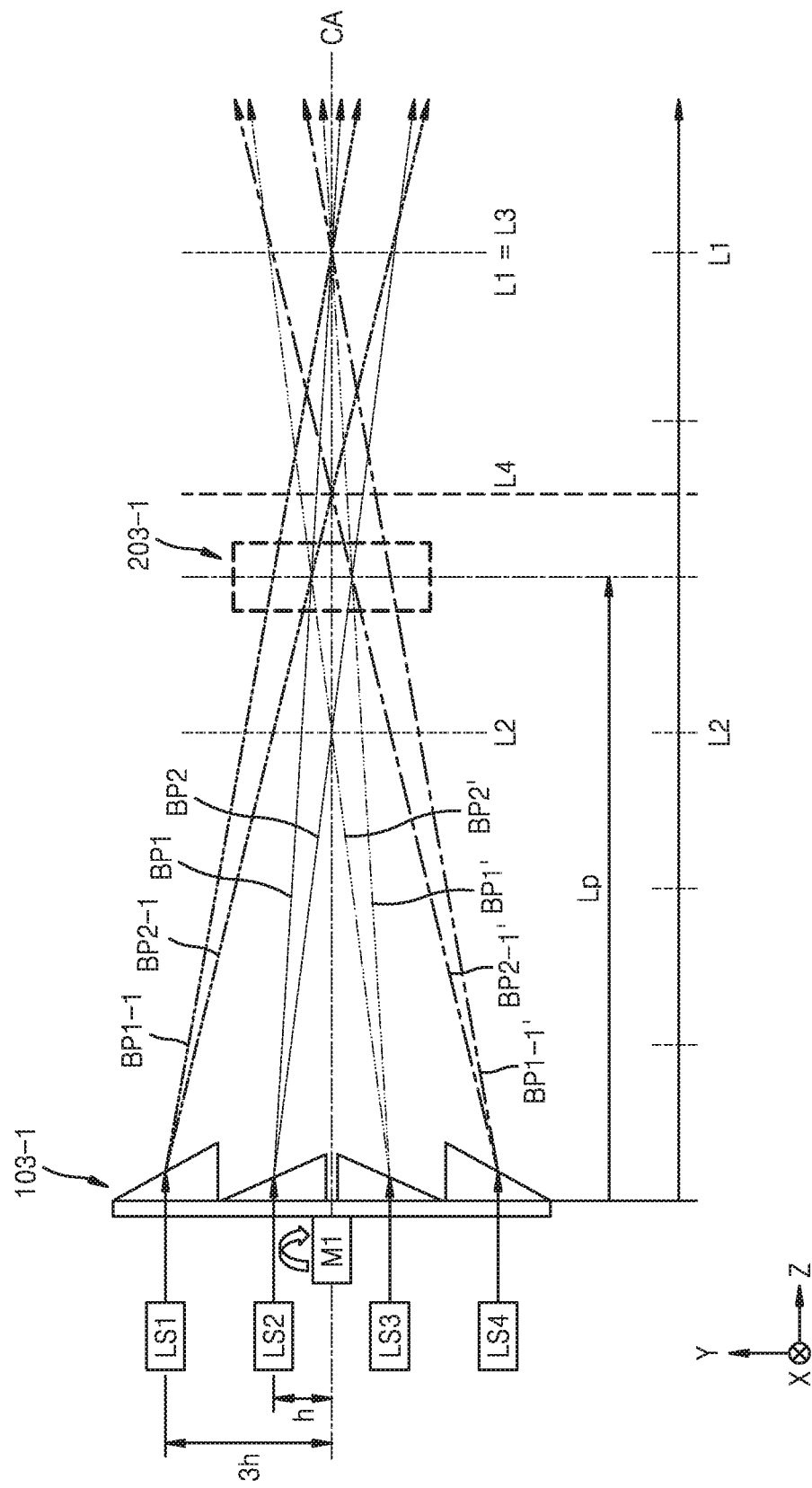
FIG. 13 illustrates a traveling path of light output from the steering unit included in the optical scanner of FIG. 12 and a location of a polygon mirror.

FIG. 13 illustrates a traveling path of light output from the steering unit 103-1 included in the optical scanner 1003-1 of FIG. 12 and a location of the polygon mirror 203-1.

Referring to FIG. 13, the steering unit 103-1 may form a plurality of focal points on the central axis CA by changing traveling paths of lights emitted from the first to fourth light sources LS1 to LS4. In FIG. 13, it is defined that distances from the steering unit 103-1 to respective focal points are L1, L2, L3, and L4. In this case, the steering unit 103-1 may be designed such that a relationship of $L2=\frac{1}{2}*L1$, $L3=2*L2=L1$, and $L4=\frac{3}{4}*L1$ is established.

In this case, a geometric relationship of $\tan(\theta 1)=h/L1$, $\tan(\theta 2)=h/L2$, $\tan(\theta 3)=3h/L3$, and $\tan(\theta 4)=3h/L4$ may be established. Herein, $\theta 1$ may be an angle made by the traveling path BP1 and the central axis CA, $\theta 2$ may be an angle made by the traveling path BP2 and the central axis CA, $\theta 3$ may be an angle made by the traveling path BP1-1 and the central axis CA, and $\theta 4$ may be an angle made by the traveling path BP2-1 and the central axis CA. For example, $\theta 1$ may be 2.5°, $\theta 2$ may be 5°, $\theta 3$ may be 7.5°, and $\theta 4$ may be 10°.

The polygon mirror 203-1 may be located on a point $L_p$ of which a distance from the steering unit 103-1 is longer than L2 and shorter than L4.

Figure 14:
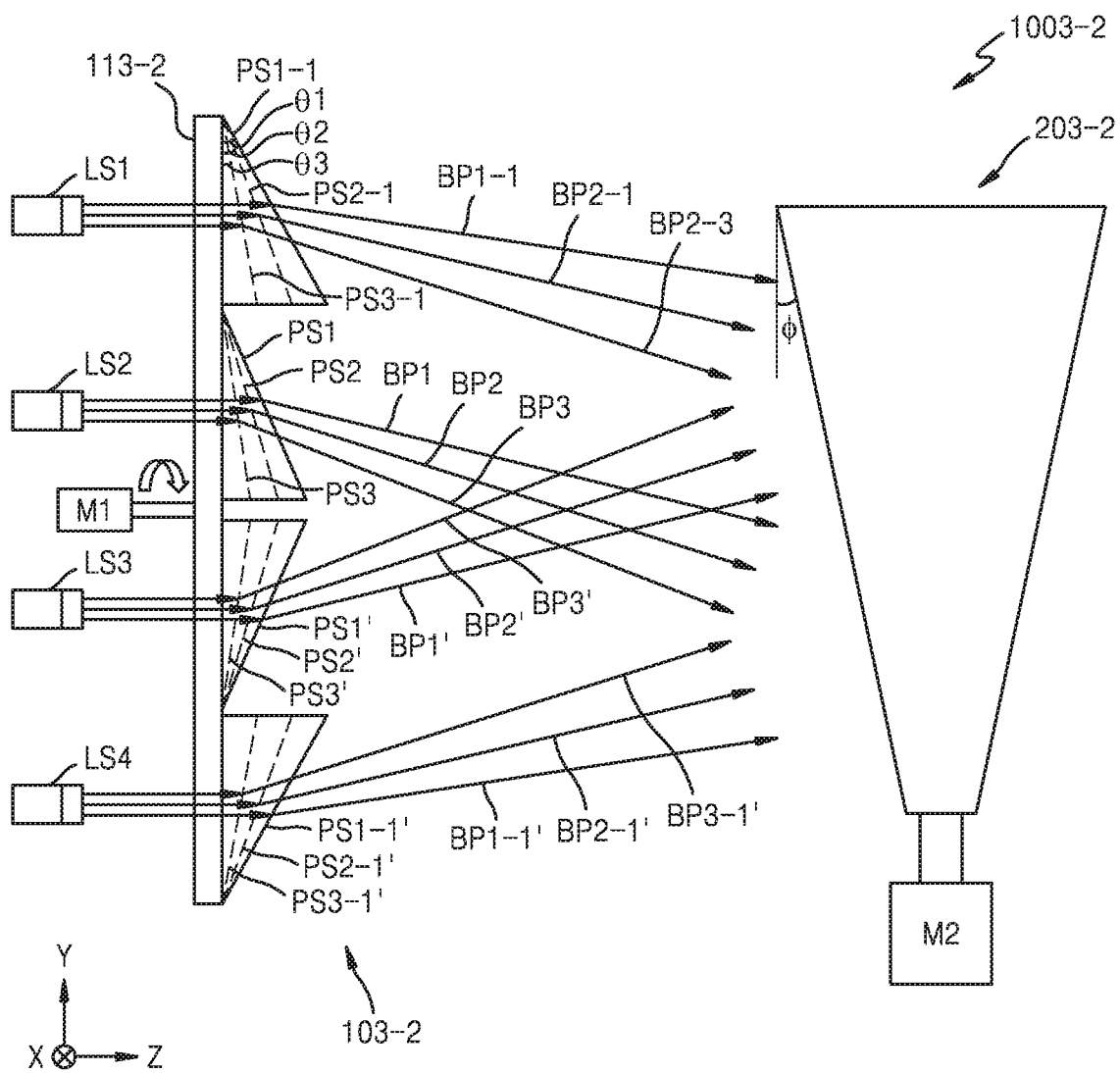
FIG. 14 is a side cross-sectional view of an optical scanner configured to perform optical scanning by using the part A-A', the part B-B', and a part C-C' of the steering unit of FIG. 11, according to an example embodiment.

FIG. 14 is a side cross-sectional view of an optical scanner 1003-2 configured to perform optical scanning by using the part A-A', the part B-B', and a part C-C' of the steering unit 103 of FIG. 11, according to an example embodiment.

Referring to FIG. 14, the optical scanner 1003-2 may include the first light source LS1, the second light source LS2, the third light source LS3, the fourth light source LS4, a steering unit 103-2, and a polygon mirror 203-2. In addition, the steering unit 103-2 and the polygon mirror 203-2 may further include the first motor M1 and the second motor M2 configured to deliver a rotational driving force thereto, respectively.

The first light source LS1, the second light source LS2, the third light source LS3, and the fourth light source LS4 may include a laser diode configured to emit laser light. However, the first to fourth light sources LS1 to LS4 are not limited to the laser diode, and may include a different light source configured to emit light other than the laser light.

The part A-A' of the steering unit 103-2 may include a plurality of first prisms PS1 and PS1' and a plurality of second prisms PS1-1 and PS1-1'. In addition, the part B-B' of the steering unit 103-2 may include a plurality of first prisms PS2 and PS2' and a plurality of second prisms PS2-1 and PS2-1'. In addition, the part C-C' of the steering unit 103-2 may include a plurality of first prisms PS3 and PS3' and a plurality of second prisms PS3-1 and PS3-1'. FIG. 14 shows, in an overlapped manner, an example where the plurality of first prisms PS1 and PS1' and the plurality of second prisms PS1-1 and PS1-1' along A-A' are located on traveling paths of lights emitted from the first to fourth light sources LS1 to LS4, a case where the plurality of first prisms PS2 and PS2' and the plurality of second prisms PS2-1 and PS2-1' along B-B' are located on traveling paths of lights emitted from the first to fourth light sources LS1 to LS4 (shown as dashed line), and a case where the plurality of first prisms PS3 and PS3' and the plurality of second prisms PS3-1 and PS3-1' along C-C' are located on traveling paths of lights emitted from the first to fourth light sources LS1 to LS4 (shown as dashed line).

Along A-A', the part B-B', and the part C-C' of the steering unit 103-2, the plurality of first prisms PS1, PS1', PS2, PS2', PS3, and PS3' and the plurality of second prisms PS1-1, PS1-1', PS2-1, PS2-1', PS3-1, and PS3-1' provided on a prism wheel 113-2 may be arranged such that a relatively thick portion is located closer to a center point of the steering unit 103-2 than a relatively thin portion.

The angle of inclination θ1 of the output facet of the second prism PS1-1, the angle of inclination θ2 of the output facet of the second prism PS2-1, and the angle of inclination θ3 of the output facet of the second prism PS3-1 may differ from each other. For example, the angle of inclination θ1 of the output facet of the second prism PS1-1 may be greater than the angle of inclination θ2 of the output facet of the second prism PS2-1, and the angle of inclination θ2 of the output facet of the second prism PS2-1 may be greater than the angle of inclination θ3 of the output facet of the second prism PS3-1.

A traveling path of light emitted from the first light source LS1 may be changed to the traveling path BP1-1 while passing through the second prism PS1-1 when the second prism PS1-1 is located on the traveling path of the light before the steering unit 103-2 is rotated. In addition, a traveling path of light emitted from the first light source LS1 may be changed to the traveling path BP2-1 different from the traveling path BP1-1 while passing through the second prism PS2-1 when the second prism PS2-1 is located on the traveling path of the light according to rotation of the steering unit 103-2. In addition, a traveling path of light emitted from the first light source LS1 may be changed to a traveling path BP3-1 different from the traveling paths BP1-1 and BP2-1 while passing through the second prism PS3-1 when the second prism PS3-1 is located on the traveling path of the light according to rotation of the steering unit 103-2.

Similar to the first light source LS1, a traveling path of light emitted from the second light source LS2 may be changed to the traveling path BP1, the traveling path BP2, and the traveling path BP3 in response to location changes according to rotation of the first prism PS1, the first prism PS2, and the first prism PS3 including output facets having different angles of inclination, respectively.

Similar to the first light source LS1, a traveling path of light emitted from the third light source LS3 may be changed to the traveling path BP1', the traveling path BP2', and a traveling path BP3' in response to location changes according to rotation of the first prism PS1', the first prism PS2', and the first prism PS3' including output facets having different angles of inclination, respectively.

Similar to the first light source LS1, a traveling path of light emitted from the fourth light source LS4 may be changed to the traveling path BP1-1', the traveling path BP2-1', and a traveling path BP3-1' in response to location changes according to rotation of the second prism PS1-1', the second prism PS2-1', and the second prism PS3-1' including output facets having different angles of inclination, respectively.

As described above, a traveling path of light may be changed to the 12 traveling paths BP1, BP1', BP2, BP2', BP3, BP3', BP1-1, BP1-1' BP2-1, BP2-1', BP3-1, and BP3-1' by the six first prisms PS1, PS1', PS2, PS2', PS3, and PS3' and the six second prisms PS1-1, PS1-1', PS2-1, PS2-1', PS3-1, and PS3-1' which may be included in the steering unit 103-2. Twelve VS areas may be formed by the 12 traveling paths BP1, BP1', BP2, BP2', BP3, BP3', BP1-1, BP1-1' BP2-1, BP2-1', BP3-1, and BP3-1' of the light. Although FIG. 14 shows 12 prisms, the number of prisms is not limited to 12, and may be greater than 12. In this case, the number of VS areas may increase.

The light which has passed through the steering unit 103-2 may be reflected from the polygon mirror 203-2 and used to perform scanning in the first and second directions. The first direction may be the Y-axis direction, and the second direction may be the X-axis direction.

Figure 15:
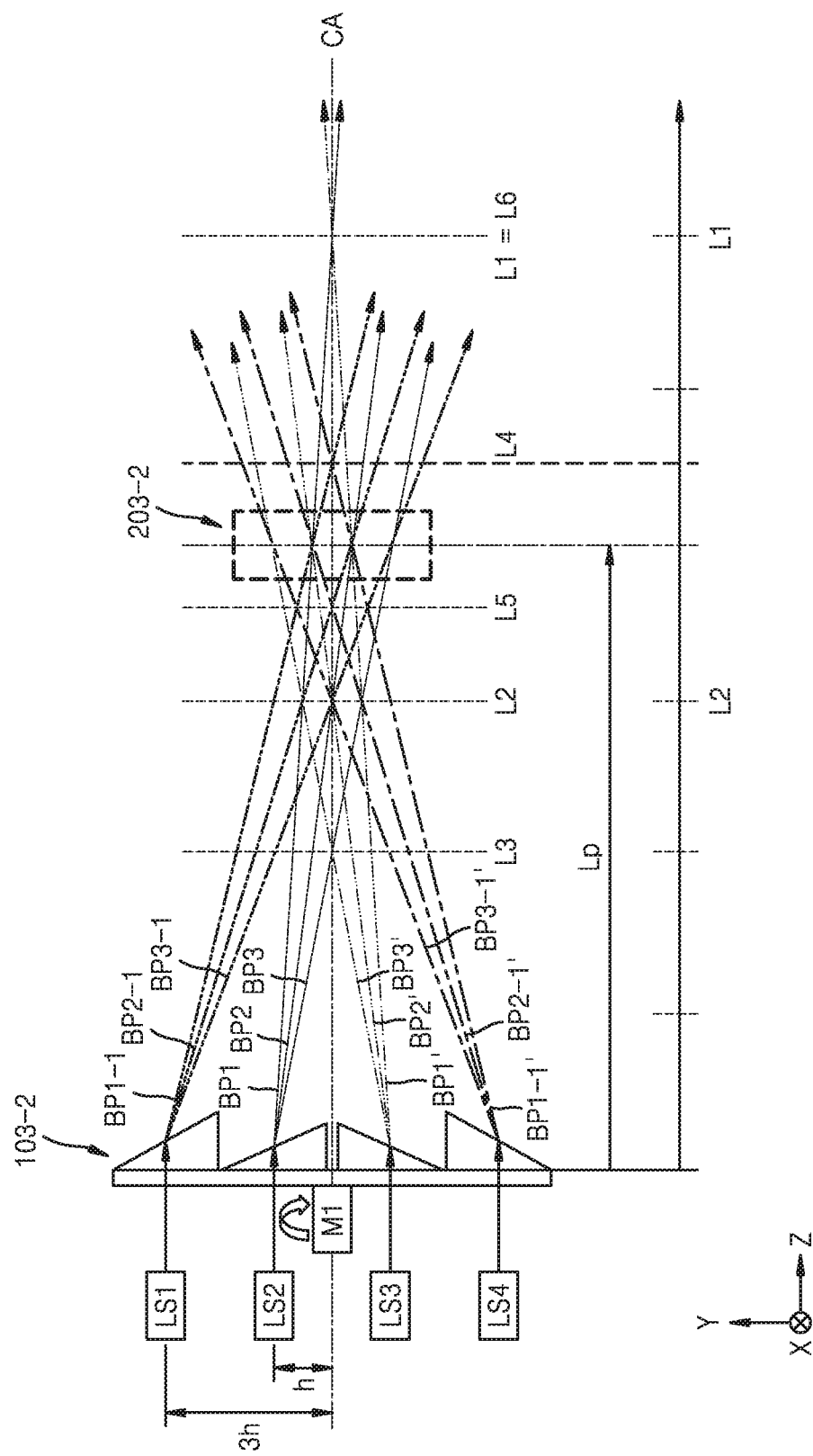
FIG. 15 illustrates a traveling path of light output from the steering unit included in the optical scanner of FIG. 14 and a location of a polygon mirror.

FIG. 15 illustrates a traveling path of light output from the steering unit 103-2 included in the optical scanner 1003-2 of FIG. 14 and a location of the polygon mirror 203-2.

Referring to FIG. 15, the steering unit 103-2 may form a plurality of focal points on the central axis CA by changing traveling paths of lights emitted from the first to fourth light sources LS1 to LS4. In FIG. 15, it is defined that distances from the steering unit 103-2 to respective focal points are L1, L2, L3, and L4. In this case, the steering unit 103-2 may be designed such that a relationship of L2=½*L1, L3=⅓*L1, L4=¾*L1, L5=⅗*L1, and L6=L2 is established.

In this case, a geometric relationship of Tan(θ1)=h/L1, Tan(θ3)=h/L3, Tan(θ4)=3h/L4, and Tan(θ6)=3h/L6 may be established. Herein, θ1 may be an angle made by the traveling path BP1 and the central axis CA, θ3 may be an angle made by the traveling path BP3 and the central axis CA, θ4 may be an angle made by the traveling path BP1-1 and the central axis CA, and θ6 may be an angle made by the traveling path BP3-1 and the central axis CA. For example, θ1 may be 2.5°, θ3 may be 7.5°, θ4 may be 10°, and θ6 may be 15°.

The polygon mirror 203-2 may be located on the point $L_p$ of which a distance from the steering unit 103-2 is longer than L2 and shorter than L4.

Figure 16:
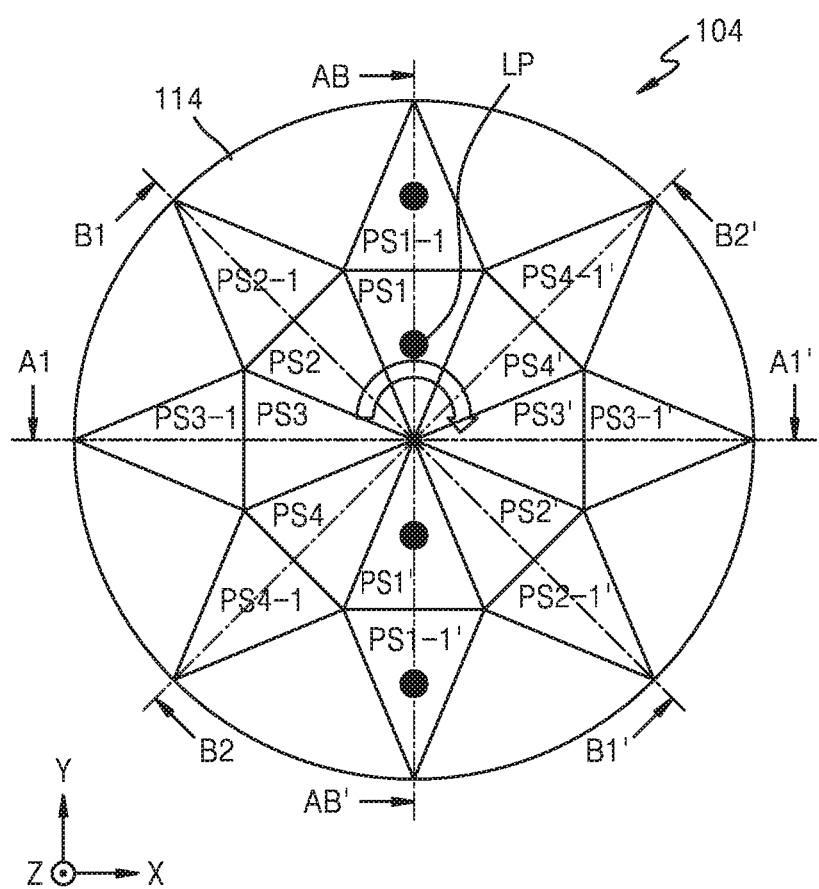
FIG. 16 is a top view of a steering unit which may be included in the optical scanner of FIG. 1, according to an example embodiment.

FIG. 16 is a top view of a steering unit 104 which may be included in the optical scanner 1000 of FIG. 1, according to an example embodiment.

Referring to FIG. 16, the steering unit 104 may have four light points LP through which lights emitted from four light sources pass, respectively.

The steering unit 104 may include a plurality of first prisms PS1, PS1', PS2, PS2', PS3, PS3', PS4, and PS4'. The first prisms PS1, PS1', PS2, PS2', PS3, PS3', PS4, and PS4' may be wedge prisms each having an incident facet through which light may be incident and an output facet through which the light is refracted and output.

The steering unit 104 may include a prism wheel 114 on which the plurality of first prisms PS1, PS1', PS2, PS2', PS3, PS3', PS4, and PS4' may be provided. The plurality of first prisms PS1, PS1', PS2, PS2', PS3, PS3', PS4, and PS4' may be arranged circularly around a central point of the prism wheel 114. The prism wheel 114 may be rotated by receiving a driving force from the outside, and according to the rotation, a pair of the first prisms PS1 and PS1', a pair of the first prisms PS2 and PS2', a pair of the first prisms PS3 and PS3', and a pair of the first prisms PS4 and PS4' may be sequentially located on the light points LP. The light points LP may be points on a part of the steering unit 104 through which light emitted from the light source LS passes.

At least two of the plurality of first prisms PS1, PS1', PS2, PS2', PS3, PS3', PS4, and PS4' may include output facets having different angles of inclination. For example, angles of inclination of the output facets of the first prisms PS1, PS2, PS3, and PS4 may be different from each other. However, an angle of inclination of the output facet of the first prism PS1' provided at a location symmetrical to that of the first prism PS1 with respect to a center point of the steering unit 104 may be the same as an angle of inclination of the output facet of the first prism PS1. In addition, an angle of inclination of the output facet of the first prism PS2' provided at a location symmetrical to that of the first prism PS2 with respect to the center point of the steering unit 104 may be the same as an angle of inclination of the output facet of the first prism PS2. Likewise, an angle of inclination of the output facet of the first prism PS3' provided at a location symmetrical to that of the first prism PS3 with respect to the center point of the steering unit 104 may be the same as an angle of inclination of the output facet of the first prism PS3. Furthermore, an angle of inclination of the output facet of the first prism PS4' provided at a location symmetrical to that of the first prism PS4 with respect to the center point of the steering unit 104 may be the same as an angle of inclination of the output facet of the first prism PS4.

In addition, the steering unit 104 may further include a plurality of second prisms PS1-1, PS1-1', PS2-1, PS2-1', PS3-1, PS3-1', PS4-1, and PS4-1' arranged outside of, and farther away from the center of the steering unit 104, the plurality of first prisms PS1, PS1', PS2, PS2', PS3, PS3', PS4, and PS4' such that the plurality of second prisms PS1-1, PS1-1', PS2-1, PS2-1', PS3-1, PS3-1', PS4-1, and PS4-1' respectively correspond to the plurality of first prisms PS1, PS1', PS2, PS2', PS3, PS3', PS4, and PS4'. The second prisms PS1-1, PS1-1', PS2-1, PS2-1', PS3-1, PS3-1', PS4-1, and PS4-1' may be wedge prisms each having an incident facet through which light may be incident and an output facet through which the light is refracted and output. The prism wheel 114 may be rotated by receiving a driving force from the outside, and according to the rotation, a pair of the second prisms PS1-1 and PS1-1', a pair of the second prisms PS2-1 and PS2-1', a pair of the second prisms PS3-1 and PS3-1', and a pair of the second prisms PS4-1 and PS4-1' may be sequentially located on the light points LP.

At least two of the plurality of second prisms PS1-1, PS1-1', PS2-1, PS2-1', PS3-1, PS3-1', PS4-1, and PS4-1' may include output facets having different angles of inclination. For example, angles of inclination of the output facets of the second prisms PS1-1, PS2-1, PS3-1, and PS4-1 may be different from each other. However, an angle of inclination of the output facet of the second prism PS1-1' provided at a location symmetrical to that of the second prism PS1-1 with respect to the center point of the steering unit 104 may be the same as an angle of inclination of the output facet of the second prism PS1-1. In addition, an angle of inclination of the output facet of the second prism PS2-1' provided at a location symmetrical to that of the second prism PS2-1 with respect to the center point of the steering unit 104 may be the same as an angle of inclination of the output facet of the second prism PS2-1. Likewise, an angle of inclination of the output facet of the second prism PS3-1' provided at a location symmetrical to that of the second prism PS3-1 with respect to the center point of the steering unit 104 may be the same as an angle of inclination of the output facet of the second prism PS3-1. Furthermore, an angle of inclination of the output facet of the second prism PS4-1' provided at a location symmetrical to that of the second prism PS4-1 with respect to the center point of the steering unit 104 may be the same as an angle of inclination of the output facet of the second prism PS4-1.

Similar to the steering unit 103-1 shown in FIG. 12, eight traveling paths of light may be formed by the plurality of first prisms PS1, PS1', PS3, and PS3' and the plurality of second prisms PS1-1, PS1-1', PS3-1, and PS3-1' included in a part AB-AB' and a part A1-A1' of the steering unit 104.

In addition, similar to the steering unit 103-2 shown in FIG. 14, 12 traveling paths of light may be formed by the plurality of first prisms PS1, PS1', PS2, PS2', PS4, and PS4' and the plurality of second prisms PS1-1, PS1-1', PS2-1, PS2-1', PS4-1, and PS4-1' included along AB-AB', B1-B1' and B2-B2' of the steering unit 104.

Therefore, by using the steering unit 104 shown in FIG. 16, light may be used to selectively scan any one of a scan area including eight VS areas and a scan area including 12 VS areas.

Figure 17:
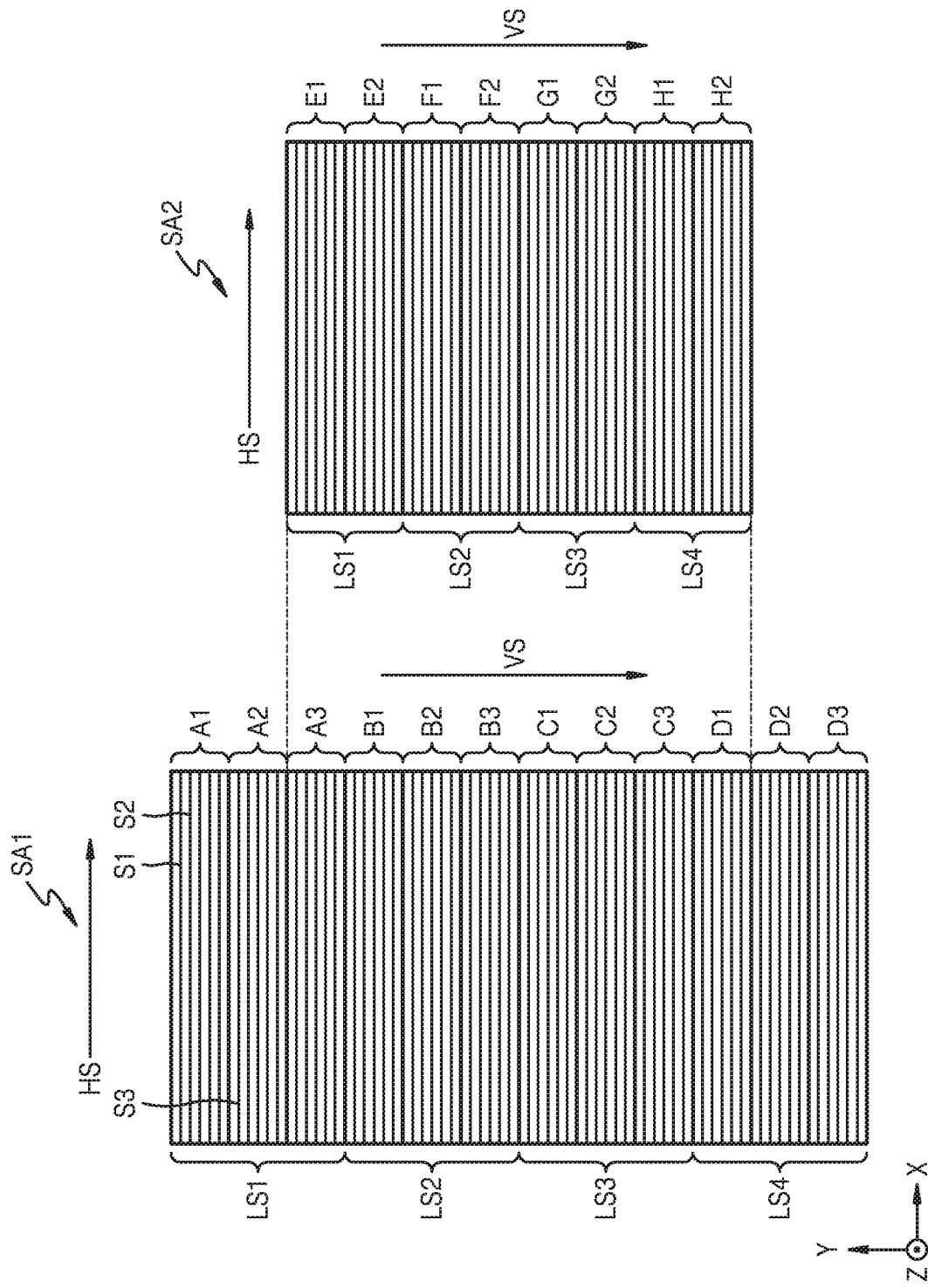
FIG. 17 illustrates a light scan area which may be formed by an optical scanner including the steering unit of FIG. 16.

FIG. 17 illustrates a light scan area which may be formed by an optical scanner including the steering unit 104 of FIG. 16.

Referring to FIG. 17, the optical scanner including the steering unit 104 may scan a first scan area SA1 by using lights through the plurality of first prisms PS1, PS1', PS2, PS2', PS4, and PS4' and the plurality of second prisms PS1-1, PS1-1', PS2-1, PS2-1', PS4-1, and PS4-1' included along AB-AB', B1-B1' and B2-B2' of the steering unit 104.

In this case, the optical scanner may form three VS areas A1, A2, and A3 by using the first light source LS1. The three VS areas A1, A2, and A3 may be formed by the principle that a traveling path of light emitted from the first light source LS1 is changed to three traveling paths by the second prisms PS1-1, PS2-1, and PS4-1.

The optical scanner may form three VS areas B1, B2, and B3 by using the second light source LS2. The three VS areas B1, B2, and B3 may be formed by the principle that a traveling path of light emitted from the second light source LS2 is changed to three traveling paths by the first prisms PS1, PS2, and PS4.

The optical scanner may form three VS areas C1, C2, and C3 by using the third light source LS3. The three VS areas C1, C2, and C3 may be formed by the principle that a traveling path of light emitted from the third light source LS3 is changed to three traveling paths by the first prisms PS1', PS2', and PS4'.

The optical scanner may form three VS areas D1, D2, and D3 by using the fourth light source LS4. The three VS areas D1, D2, and D3 may be formed by the principle that a traveling path of light emitted from the fourth light source LS4 is changed to three traveling paths by the first prisms PS1-1', PS2-1', and PS4-1'.

The first scan area SA1 includes the 12 VS areas A1, A2, A3, B1, B2, B3, C1, C2, C3, D1, D2, and D3, but the number of VS areas may increase along with an increase in the number of first prisms. In addition, similar to where the number of first prisms increases, when the number of second prisms increases, the number of VS areas may increase.

The VS area A1 may include five vertical channels. The five vertical channels including the first vertical channel S1 and the second vertical channel S2 included in the VS area A1 may be formed by five reflective facets of a polygon mirror (not shown), respectively. Corresponding vertical channels included in the other VS areas A2, A3, B1, B2, B3, C1, C2, C3, D1, D2, and D3 may also be formed by the five reflective facets of the polygon mirror, respectively. As described above, the number of reflective facets of the polygon mirror may be five or more, and thus, the number of vertical channels included in each of the VS areas A1, A2, A3, B1, B2, B3, C1, C2, C3, D1, D2, and D3 may also be five or more.

As such, the number of channels in a VS area may increase according to the number of light sources, the number of first and second prisms corresponding to the number of light sources, and the number of reflective facets of the polygon mirror.

As described above, HS may be achieved by rotation of the polygon mirror. HS may be a scan achieved in the X-axis direction. For example, when the polygon mirror is rotated by a second motor (not shown), an incident angle and a reflective angle of incident light on one arbitrary reflective facet of the five reflective facets may be changed, thereby achieving HS.

As described above, the optical scanner including the plurality of first prisms PS1, PS1', PS2, PS2', PS4, and PS4' and the plurality of second prisms PS1-1, PS1-1', PS2-1, PS2-1', PS4-1, and PS4-1' included in the part AB-AB', the part B1-B1' and the part B2-B2' of the steering unit 104 of FIG. 16 may form the first scan area SA1 including 60 vertical channels. For example, one of a plurality of light sources included in the optical scanner may form three vertical scan areas by the steering unit 104. In addition, each vertical scan area may include five vertical channels formed by the five reflective facets of the polygon mirror. Therefore, when four light sources are used, 4×3×5=60 vertical channels may be formed.

Meanwhile, the optical scanner including the steering unit 104 may scan a second scan area SA2 by using lights through the plurality of first prisms PS1, PS1', PS3, and PS3' and the plurality of second prisms PS1-1, PS1-1', PS3-1, and PS3-1' included in the part AB-AB' and the part A1-A1' of the steering unit 104.

In this case, the optical scanner may form two VS areas E1 and E2 by using the first light source LS1. The two VS areas E1 and E2 may be formed by the principle that a traveling path of light emitted from the first light source LS1 is changed to two traveling paths by the second prisms PS1-1 and PS3-1.

The optical scanner may form two VS areas F1 and F2 by using the second light source LS2. The two VS areas F1 and F2 may be formed by the principle that a traveling path of light emitted from the second light source LS2 is changed to two traveling paths by the first prisms PS1 and PS3.

The optical scanner may form two VS areas G1 and G2 by using the third light source LS3. The two VS areas G1 and G2 may be formed by the principle that a traveling path of light emitted from the third light source LS3 is changed to two traveling paths by the first prisms PS1' and PS3'.

The optical scanner may form two VS areas H1 and H2 by using the fourth light source LS4. The two VS areas H1 and H2 may be formed by the principle that a traveling path of light emitted from the fourth light source LS4 is changed to two traveling paths by the first prisms PS1-1' and PS3-1'.

The second scan area SA2 includes the eight VS areas E1, E2, F1, F2, G1, G2, H1, and H2, but the number of VS areas may increase along with an increase in the number of first prisms. In addition, similar to where the number of first prisms increases, when the number of second prisms increases, the number of VS areas may increase.

Similar to the VS areas A1, A2, A3, B1, B2, B3, C1, C2, C3, D1, D2, and D3, the number of vertical channels included in each of the VS areas E1, E2, F1, F2, G1, G2, H1, and H2 may be five by the five reflective facets of the polygon mirror. As described above, the number of reflective facets of the polygon mirror may be five or more, and thus, the number of vertical channels included in each of the VS areas E1, E2, F1, F2, G1, G2, H1, and H2 may be five or more.

As such, the number of channels in a VS area may increase according to the number of light sources, the number of first and second prisms corresponding to the number of light sources, and the number of reflective facets of the polygon mirror.

As described above, HS may be achieved by rotation of the polygon mirror. HS may be a scan achieved in the X-axis direction. For example, when the polygon mirror is rotated by the second motor not shown, an incident angle and a reflective angle of incident light on one arbitrary reflective facet of the five reflective facets may be changed, thereby achieving HS.

As described above, the optical scanner including the plurality of first prisms PS1, PS1', PS3, and PS3' and the plurality of second prisms PS1-1, PS1-1', PS3-1, and PS3-1' included along AB-AB' and A1-A1' of the steering unit 104 may form the second scan area SA2 including 40 vertical channels. For example, one of the plurality of light sources included in the optical scanner may form two vertical scan areas by the steering unit 104, and each vertical scan area may include five vertical channels formed by the five reflective facets of the polygon mirror, and thus, when four light sources are used, 4×2×5=40 vertical channels may be formed.

Figure 18:
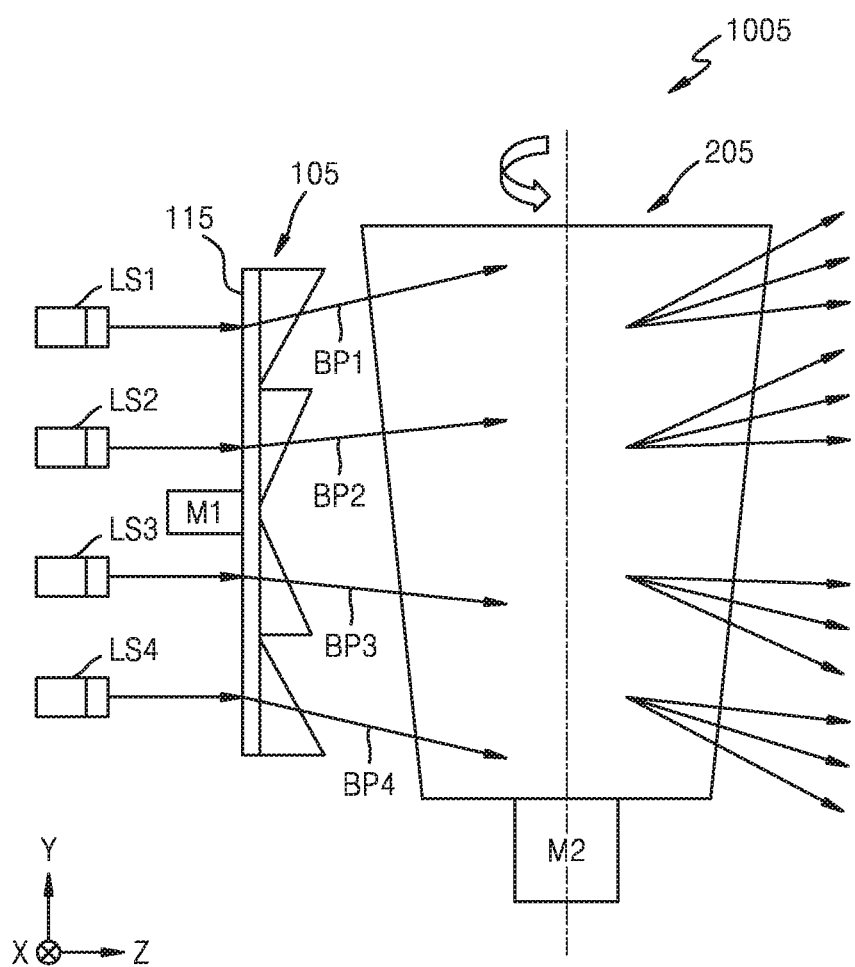
FIG. 18 is a side cross-sectional view of an optical scanner according to an example embodiment.

FIG. 18 is a side cross-sectional view of an optical scanner 1005 according to an example embodiment. When a description is made with reference to FIG. 18, a duplicated description of FIG. 12 or 14 is not repeated.

A plurality of first prisms and second prisms included in the optical scanner 1005 may be located such that a relatively thick portion is provided at a farther location from a central point of a steering unit 105 than a relatively thin portion.

The steering unit 105 may perform scanning in the first direction by using light, and the first direction may be the Y-axis direction of FIG. 1. For example, a traveling path of light emitted from the first light source LS1 may be changed to the traveling path BP1 in the first direction. A traveling path of light emitted from the second light source LS2 may be changed to the traveling path BP2 in the first direction. A traveling path of light emitted from the third light source LS3 may be changed to the traveling path BP3 in the first direction. A traveling path of light emitted from the fourth light source LS4 may be changed to the traveling path BP4 in the first direction. The traveling paths BP1, BP2, BP3, and BP4 may be in directions diverging from output facets of the plurality of first prisms and second prisms.

Figure 19:
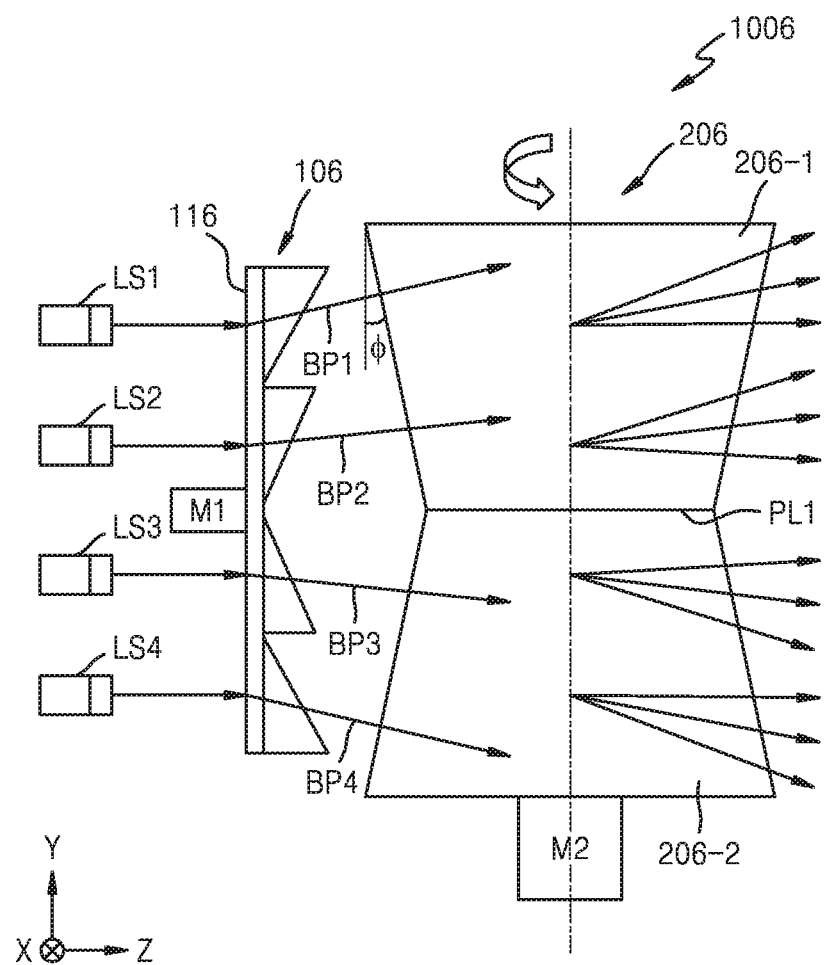
FIG. 19 is a side cross-sectional view of an optical scanner according to an example embodiment.

FIG. 19 is a side cross-sectional view of an optical scanner 1006 according to an example embodiment. When a description is made with reference to FIG. 19, a duplicated description of FIG. 12 or 14 is not repeated.

The optical scanner 1006 shown in FIG. 19 may be the same as the optical scanner 1005 shown in FIG. 18 except for a polygon mirror 206.

Referring to FIG. 19, the polygon mirror 206 may include two or more sub-polygon mirrors provided at symmetrical locations with respect to a plane PL1 parallel to traveling directions of lights emitted from the first to fourth light sources LS1 to LS4. Sub-polygon mirrors 206-1 and 206-2 provided at symmetrical locations with respect to the plane PL1 among the two or more sub-polygon mirrors may be arranged so as to have the same shape.

For example, the sub-polygon mirror 206-1 and the sub-polygon mirror 206-2 may be symmetrical with respect to the plane PL1. In this case, a side cross-section of the polygon mirror 206 including the sub-polygon mirror 206-1 and the sub-polygon mirror 206-2 may be a polygon having a shape of which a width is narrowed and then widened from a middle portion from the top to the bottom in the Y-axis direction.

The sub-polygon mirrors 206-1 and 206-2 may include a plurality of reflective facets that reflect light output from a steering unit 106. The plurality of reflective facets may be inclined at a certain angle $\Phi$ from a traveling path of light and may perform scanning in the first direction by using the light. The first direction may be the Y-axis direction. The inclined angle $\Phi$ of each of the plurality of reflective facets may vary depending on the reflective facets. The traveling path of the light may be changed in the first direction by the plurality of reflective facets inclined at different angles $\Phi$.

The plurality of reflective facets may be arranged circularly around the center of the polygon mirror 206. The polygon mirror 206 may be rotated around the Y-axis direction as a rotational axis. During the rotation, one arbitrary facet of the plurality of reflective facets may reflect the light to perform scanning in the second direction. The second direction may be the X-axis direction.

As described above, the polygon mirror 206 may perform scanning in both the first direction and the second direction by using light.

Figure 20:
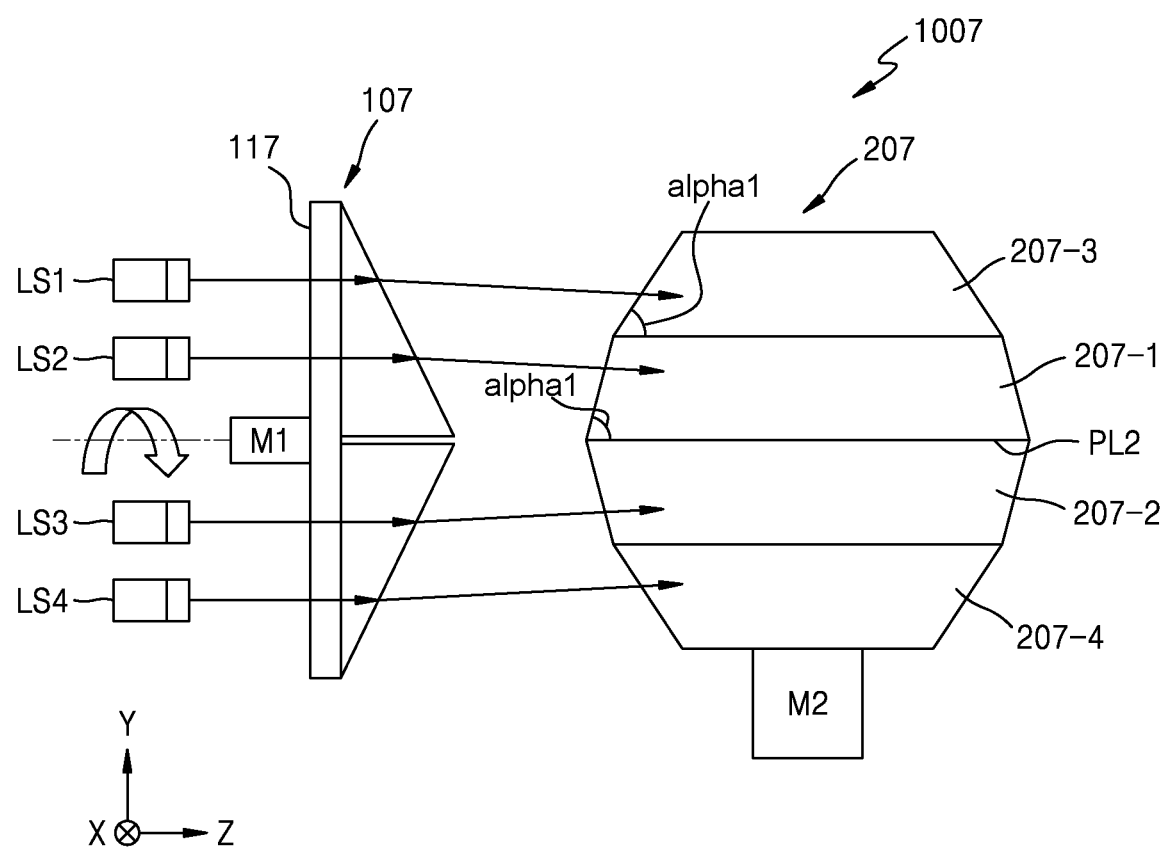
FIG. 20 is a side cross-sectional view of an optical scanner according to an example embodiment.

FIG. 20 is a side cross-sectional view of an optical scanner 1007 according to an example embodiment. When a description is made with reference to FIG. 20, a duplicated description of FIG. 12 or 14 is not repeated.

First to fourth light sources LS1 to LS4 shown in FIG. 20 may be the same as the first to fourth light sources LS1 to LS4 shown in FIG. 18. In addition, a steering unit 107 shown in FIG. 20 may be the same as the steering unit 102 shown in FIG. 9.

Referring to FIG. 20, a polygon mirror 207 may include two or more sub-polygon mirrors 207-1, 207-2, 207-3, and 207-4 provided at symmetrical locations with respect to a plane PL2 parallel to traveling directions of lights emitted from the first to fourth light sources LS1 to LS4. The sub-polygon mirrors 207-1 and 207-2 provided at symmetrical locations with respect to the plane PL2 among the two or more sub-polygon mirrors 207-1, 207-2, 207-3, and 207-4 may be arranged so as to have the same shape. In addition, the sub-polygon mirrors 207-3 and 207-4 provided at symmetrical locations with respect to the plane PL2 among the two or more sub-polygon mirrors 207-1, 207-2, 207-3, and 207-4 may be arranged so as to have the same shape.

The sub-polygon mirrors 207-1, 207-2, 207-3, and 207-4 may include a plurality of reflective facets that reflect light output from the steering unit 107. The plurality of reflective facets may be inclined at a certain angle $\alpha 1$ or $\alpha 2$ from a traveling path of the light and may perform scanning in the first direction by using the light. The first direction may be the Y-axis direction. The inclined angle $\alpha 2$ of the reflective facets of the sub-polygon mirror 207-1 may differ from the inclined angle $\alpha 1$ of the reflective facets of the sub-polygon mirror 207-3. The inclined angles $\alpha 1$ and $\alpha 2$ of each of the plurality of reflective facets may vary depending on the reflective facets. The traveling path of the light may be changed in the first direction by the plurality of reflective facets inclined at different angles $\alpha 1$ and $=2$.

The plurality of reflective facets may be arranged circularly around the center of the polygon mirror 207. The polygon mirror 207 may be rotated around the Y-axis direction as a rotational axis. During the rotation, one arbitrary facet of the plurality of reflective facets may reflect the light to perform scanning in the second direction. The second direction may be the X-axis direction. As described above, the polygon mirror 207 may perform scanning in both the first direction and the second direction by using light.

Figure 21:
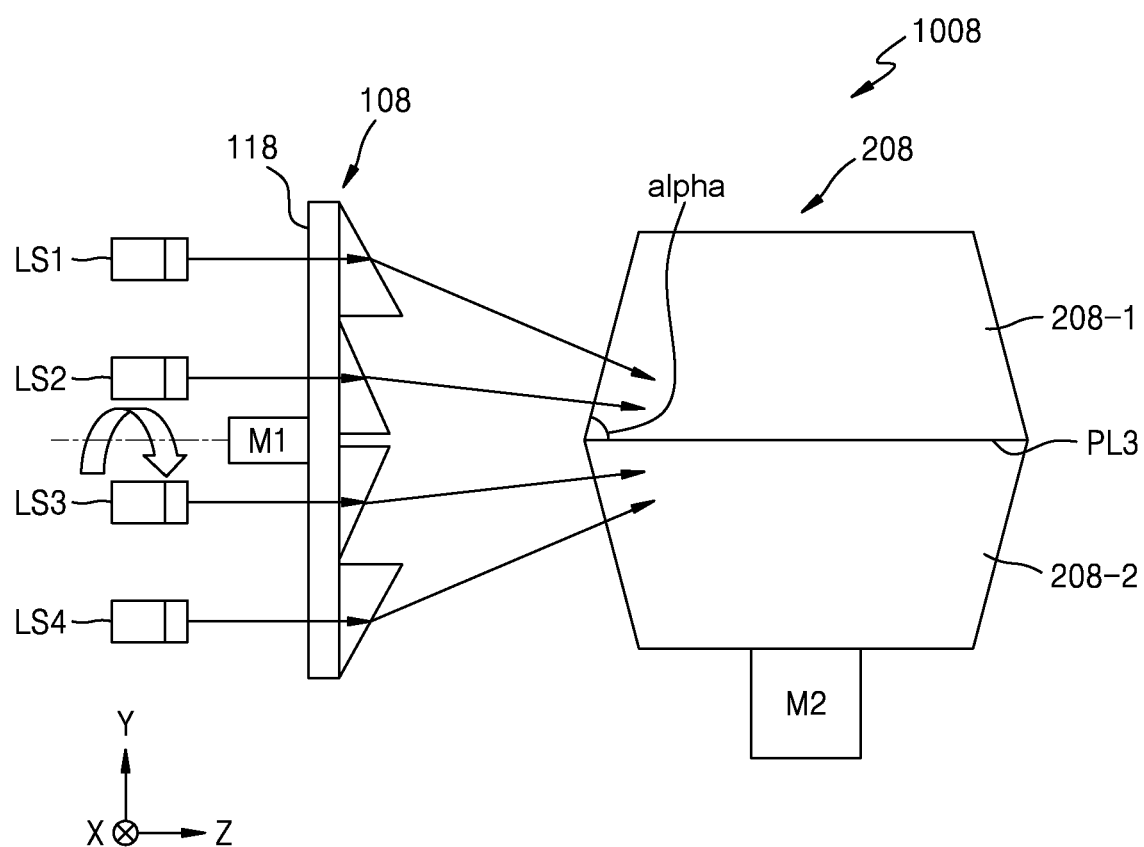
FIG. 21 is a side cross-sectional view of an optical scanner according to an example embodiment.

FIG. 21 is a side cross-sectional view of an optical scanner 1008 according to an example embodiment.

The first to fourth light sources LS1 to LS4 shown in FIG. 21 may also be the same as the first to fourth light sources LS1 to LS4 shown in FIG. 18. A steering unit 108 shown in FIG. 21 may be the same as the steering unit 103-1 or 103-2 shown in FIG. 12 or 14.

Referring to FIG. 21, a polygon mirror 208 may include two or more sub-polygon mirrors provided at symmetrical locations with respect to a plane PL3 parallel to traveling directions of lights emitted from the first to fourth light sources LS1 to LS4. Sub-polygon mirrors 208-1 and 208-2 provided at symmetrical locations with respect to the plane PL3 among the two or more sub-polygon mirrors may be arranged so as to have the same shape. For example, the sub-polygon mirror 208-1 may be symmetrical to the sub-polygon mirror 208-2 with respect to the plane PL3. In this case, a side cross-section of the polygon mirror 208 including the sub-polygon mirror 208-1 and the sub-polygon mirror 208-2 may be a polygon having a shape of which a width is widened and then narrowed from a middle portion from the top to the bottom in the Y-axis direction.

The sub-polygon mirrors 208-1 and 208-2 may include a plurality of reflective facets that reflect light output from the steering unit 108. The plurality of reflective facets may be inclined at a certain angle $\alpha$ from a traveling path of light and may perform scanning in the first direction by using the light. The first direction may be the Y-axis direction. The inclined angle $\alpha$ of each of the plurality of reflective facets may vary depending on the reflective facets. The traveling path of the light may be changed in the first direction by the plurality of reflective facets inclined at different angles $\alpha$.

The plurality of reflective facets may be arranged circularly around the center of the polygon mirror 208. The polygon mirror 208 may be rotated around the Y-axis direction as a rotational axis. During the rotation, one arbitrary facet of the plurality of reflective facets may reflect the light to perform scanning in the second direction. The second direction may be the X-axis direction. As described above, the polygon mirror 208 may perform scanning in both the first direction and the second direction by using light.

Figure 22:
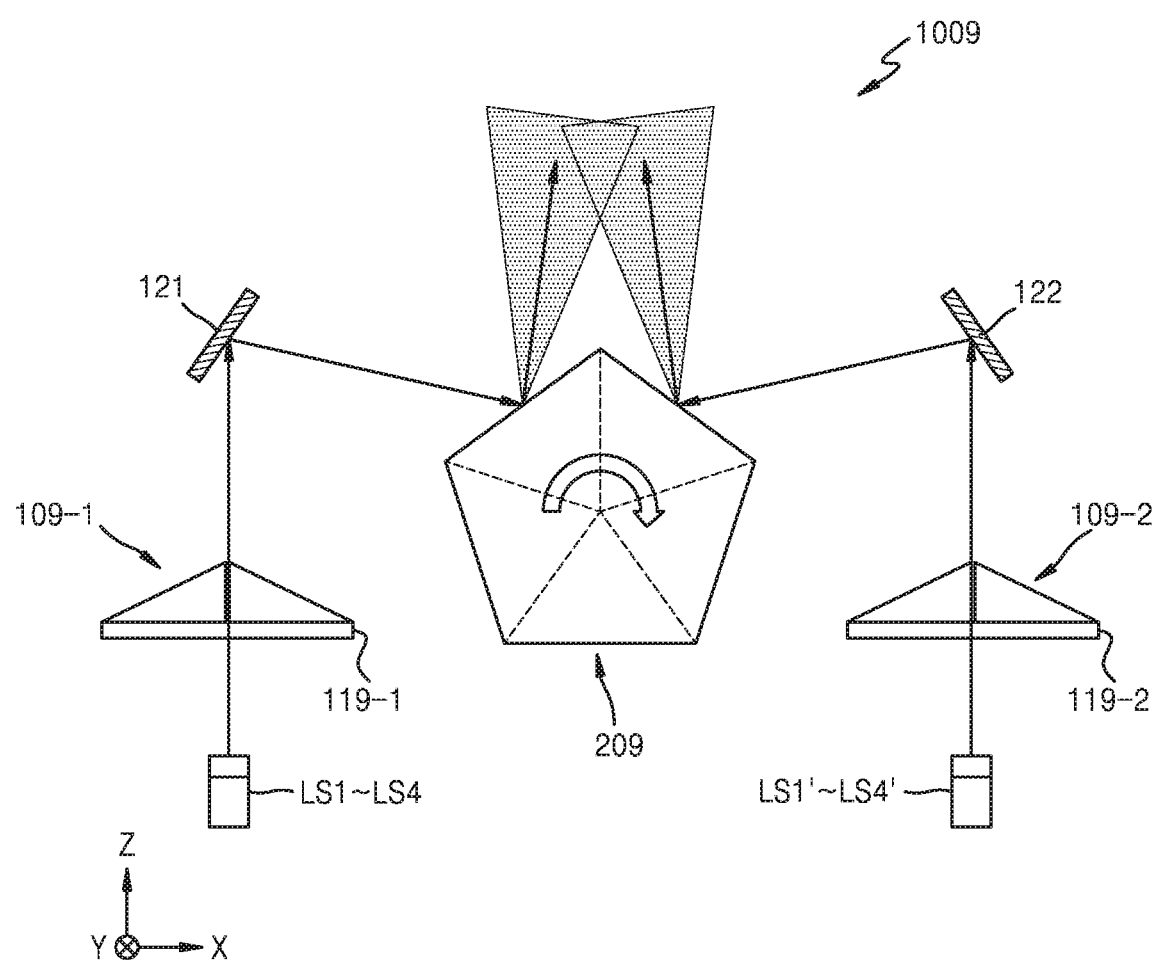
FIG. 22 is a side cross-sectional view of an optical scanner according to an example embodiment.

FIG. 22 is a side cross-sectional view of an optical scanner 1009 according to an example embodiment.

Referring to FIG. 22, the optical scanner 1009 may include a steering unit 109-1 configured to perform scanning in the first direction by refracting lights emitted from the first to fourth light sources LS1 to LS4, a steering unit 109-2 configured to perform scanning in the first direction by refracting lights emitted from the first' to fourth' light sources LS1' to LS4', a polygon mirror 209 configured to reflect lights output from the steering units 109-1 and 109-2 to perform scanning in the second direction different from the first direction, and reflective members 121 and 122 configured to reflect lights output from the steering units 109-1 and 109-2 such that the reflected lights travel to the polygon mirror 209.

In addition, the first' to fourth' light sources LS1' to LS4' may be provided at locations symmetrical to those of the first to fourth light sources LS1 to LS4 with respect to the polygon mirror 209. In addition, the steering unit 109-2 and the reflective member 122 may be provided at locations symmetrical to those of the steering unit 109-1 and the reflective member 121 with respect to the polygon mirror 209. The steering units 109-1 and 109-2 may include any one of the steering units described with reference to FIGS. 1 to 21.

As shown in FIG. 22, when the two steering units 109-1 and 109-2 are arranged at both sides of the polygon mirror 209, the number of light sources may increase than when only one steering unit is arranged at one side of the polygon mirror 209, thereby increasing a size of an optical system. In this case, scanning may be performed by individually rotating both the steering units 109-1 and 109-2 or by driving the steering units 109-1 and 109-2 at once through a mechanical connection therebetween.

Figure 23:
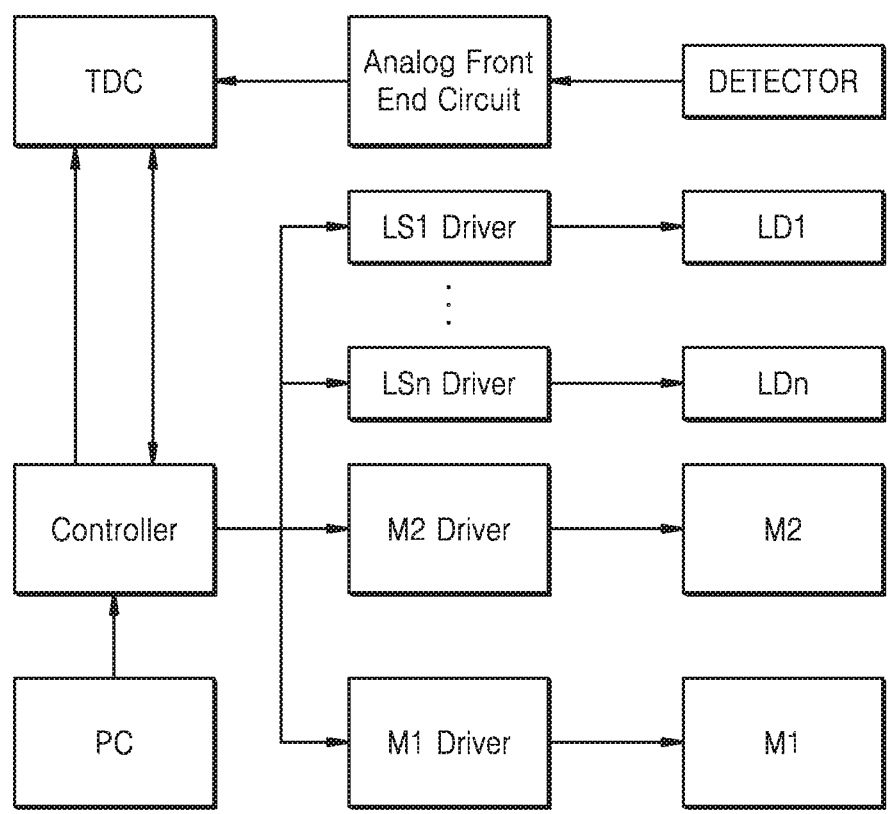
FIG. 23 is a block diagram of a control system for the optical scanners according to the example embodiments of FIGS. 1 to 22.

FIG. 23 is a block diagram of a control system for the optical scanners 1000, 1001, 1002, 1003-1, 1003-2, 1005, 1006, 1007, 1008, and 1009 according to example embodiments of FIGS. 1 to 22.

Referring to FIG. 23, the optical scanners 1000, 1001, 1002, 1003-1, 1003-2, 1005, 1006, 1007, 1008, and 1009 according to example embodiments may include a controller. The controller may independently apply a driving signal for driving at least one light source LS1, LS2 ... LSn (n is an integer) to a plurality of light source drivers LS1 Driver ... LSn Driver (n is an integer) respectively corresponding to the at least one light source LS1, LS2 ... LSn (n is an integer). The at least one light source LS1, LS2 ... LSn (n is an integer) may emit light in response to the driving signal applied to the plurality of light source drivers LS1 Driver ... LSn Driver (n is an integer).

The controller may apply, to a first motor driver M1 Driver and a second motor driver M2 Driver, respective driving signals for driving the first motor M1 and the second motor M2 configured to respectively rotate a steering unit and a polygon mirror included in each of the optical scanners 1000, 1001, 1002, 1003-1, 1003-2, 1005, 1006, 1007, 1008, and 1009 according to the various embodiments.

As described below, a LIDAR system including the optical scanner 1000, 1001, 1002, 1003-1, 1003-2, 1005, 1006, 1007, 1008, or 1009 may include a detector configured to receive reflected light of light used to scan an object by the optical scanner 1000, 1001, 1002, 1003-1, 1003-2, 1005, 1006, 1007, 1008, or 1009. The optical scanner 1000, 1001, 1002, 1003-1, 1003-2, 1005, 1006, 1007, 1008, or 1009 may further include a time digital counter (TDC) capable of measuring a time of flight (TOF) of the light received by the detector. The controller may control the TDC.

Various kinds of controls of the controller described above may be performed by commands of a user through a personal computer (PC). An analog front end (AFE) circuit provides conditioning for the electrical signal generated by the detector before reaching the TDC. The conditioning may include amplification, shaping, filtering, impedance matching and amplitude control.

Figure 24:
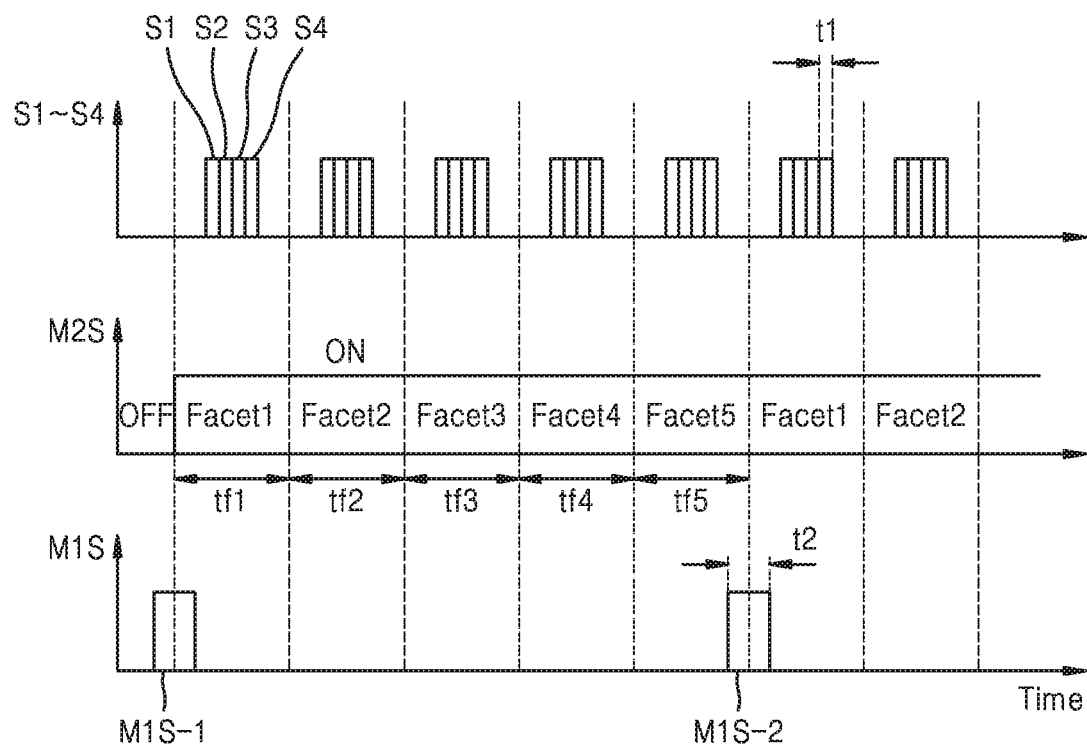
FIG. 24 is a graph of comparing application durations of driving signals which the controller shown in FIG. 23 applies to the optical scanners according to the example embodiments of FIGS. 1 to 22.

FIG. 24 is a graph of comparing application durations of driving signals which the controller shown in FIG. 23 applies to the optical scanners 1000, 1001, 1002, 1003-1, 1003-2, 1005, 1006, 1007, 1008, or 1009 according to example embodiments of FIGS. 1 to 22.

Referring to FIG. 24, the controller may continuously deliver, to the second motor M2, a driving signal M2S for driving the second motor M2 during scanning (ON state).

The controller may sequentially deliver first to fourth driving signals S1 to S4 to the first to fourth light sources LS1 to LS4, respectively, during a time $t_{f1}$ for HS by a first facet Facet1 among a plurality of reflective facets of a polygon mirror included in the optical scanner 1000, 1001, 1002, 1003-1, 1003-2, 1005, 1006, 1007, 1008, or 1009. Each of application durations of the first to fourth driving signals S1 to S4 may be the same as t1. A total sum of the application durations of the first to fourth driving signals S1 to S4 may be 40% to 50% of the time $t_{f1}$ for HS by the first facet Facet1. Likewise, the controller may sequentially deliver the first to fourth driving signals S1 to S4 to the first to fourth light sources LS1 to LS4, respectively, during each of times $t_{f2}$, $t_{f3}$, $t_{f4}$, and $t_{f5}$ for HS by each of a second facet Facet2, a third facet Facet3, a fourth facet Facet4, and a fifth facet Facet5 among the plurality of reflective facets.

The controller may deliver, to the first motor M1, a driving signal M1S-1 for rotating a steering unit included in the optical scanner 1000, 1001, 1002, 1003-1, 1003-2, 1005, 1006, 1007, 1008, or 1009 before the HS by the first facet Facet1 starts. An application duration of the driving signal M1S-1 delivered to the first motor M1 may end before the first driving signal S1 included in the time $t_{f1}$ is delivered to the first light source LS1. Thereafter, during the HS by the second facet Facet2, the third facet Facet3, the fourth facet Facet4, and the fifth facet Facet5, an additional driving signal for rotating the steering unit may not be applied. The controller may apply, to the first motor M1, a driving signal M1S-2 for rotating the steering unit immediately after an application duration of the fourth driving signal S4 included in the time $t_{f5}$ ends.

Referring back to FIG. 17, the VS areas A1, B1, C1, and D1 may be formed by the first to fourth light sources LS1 to LS4 driven in response to the first to fourth driving signals S1 to S4 for the times $t_{f1}$ to $t_{f5}$. In addition, after the controller applies the driving signal M1S-2 to the first motor M1, the VS areas A2, B2, C2, and D2 may be formed by the first to fourth light sources LS1 to LS4 driven in response to the first to fourth driving signals S1 to S4 for the times $t_{f1}$ to $t_{f5}$. As described above, a scan area may be formed by an appropriate combination of driving signals to be applied to the first motor M1, the second motor M2, a polygon mirror, and the first to fourth light sources LS1 to LS4.

Figure 25:
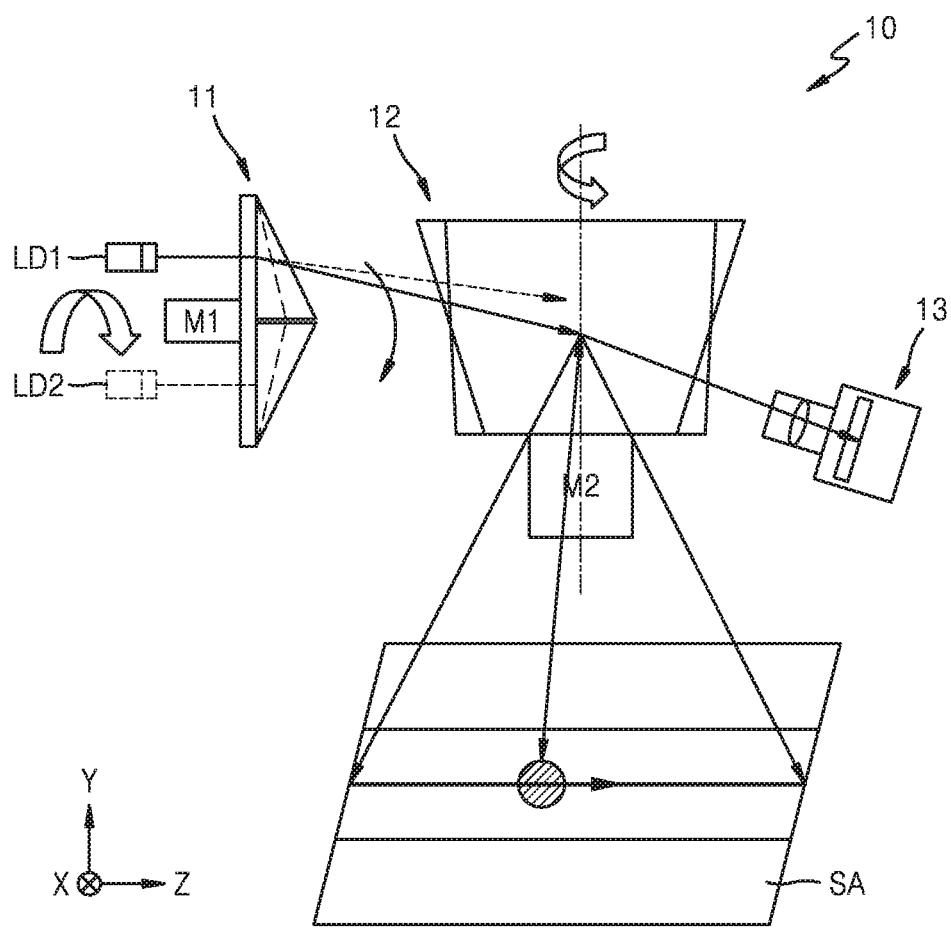
FIG. 25 illustrates a light detection and ranging (LIDAR) system including an optical scanner, according to example embodiments.

FIG. 25 illustrates a LIDAR system 10 including the optical scanner 1000, 1001, 1002, 1003-1, 1003-2, 1005, 1006, 1007, 1008, or 1009, according to example embodiments.

Referring to FIG. 25, the LIDAR system 10 may include an optical scanner configured to scan an object by using light and a detector 13 configured to receive light reflected from the object.

The optical scanner may include any one of the plurality of optical scanners 1000, 1001, 1002, 1003-1, 1003-2, 1005, 1006, 1007, 1008, and 1009 described with reference to FIGS. 1 to 24.

The detector 13 may be provided at a location where light which is reflected from the object, incident back to a reflective facet of a polygon mirror 12, then reflected back from the reflective facet is received. The reflective facet of the polygon mirror 12 to which the light is incident back after reflected from the object may be the same as a reflective facet from which lights emitted from the first and second light sources LS1 and LS2 are reflected to the object. The detector 13 may include a highly sensitive avalanche photodiode (APD), single-photon avalanche photodiode (SPAD), silicon photomultiplier (SiPM), or the like. In addition, the detector 13 may further include a TDC configured to measure a TOF of the light.

Since light emission by the optical scanner and light reception by the detector 13 are achieved through the same reflective facet of the polygon mirror 12, when the LIDAR system 10 is used, a horizontal angle of field may increase, and light reception efficiency may increase.

Figure 26:
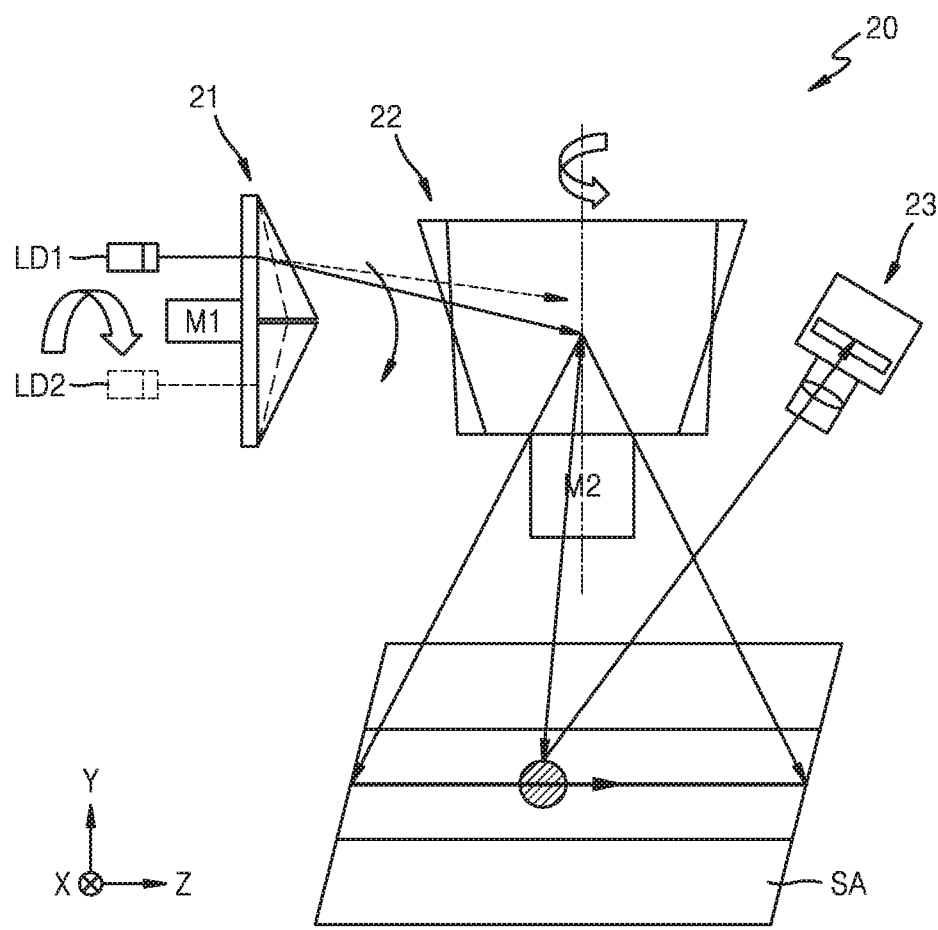
FIG. 26 illustrates a LIDAR system including an optical scanner, according to example embodiments.

FIG. 26 illustrates a LIDAR system 20 including an optical scanner 1000, 1001, 1002, 1003-1, 1003-2, 1005, 1006, 1007, 1008, or 1009, according to example embodiments. When a description is made with reference to FIG. 26, a duplicated description of FIG. 25 is not repeated.

Referring to FIG. 26, the LIDAR system 20 may include an optical scanner configured to scan an object by using light and a detector 23 configured to receive light reflected from the object.

The optical scanner may include any one of the plurality of optical scanners 1000, 1001, 1002, 1003-1, 1003-2, 1005, 1006, 1007, 1008, and 1009 described with reference to FIGS. 1 to 24.

The detector 23 may be provided at a location where light reflected from the object is directly received. The detector 23 may include a highly sensitive APD, SPAD, SiPM, or the like. In addition, the detector 23 may further include a TDC configured to measure a TOF of the light.

Since light emission by the optical scanner and light reception by the detector 23 are separately achieved, when the LIDAR system 20 is used, reflective facets of a polygon mirror 22 may be reduced or miniaturized, and an F-number of the detector 23 may be separately designed, thereby enabling light reception efficiency to be improved.

The example embodiments of the present disclosure may provide an optical scanner configured to a scan area including an increased number of vertical channels by using a plurality of prisms, and a LIDAR system including the same.

It should be understood that example embodiments described herein should be considered in a descriptive sense only and not for purposes of limitation. Descriptions of features or aspects within each example embodiment should typically be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. An optical scanner comprising:
   at least one light source configured to emit light;
   a steering unit configured to perform scanning in a first direction based on the light emitted from the at least one light source, the steering unit comprising a plurality of first prisms, and each of the plurality of first prisms comprising an incident facet configured to pass the light emitted from the at least one light source, and an output facet configured to refract and output the light; and
   a polygon mirror configured to perform, by using the light output from the steering unit, scanning in a second direction different than the first direction based on a rotation of the polygon mirror, the polygon mirror comprising a plurality of reflective facets, and each of the plurality of reflective facets being configured to reflect the light output from the steering unit,
   wherein all the plurality of reflective facets of the polygon mirror have flat surfaces and are disposed circularly around a center point of the polygon mirror in a circumferential direction, and an angle of inclination of each of the plurality of reflective facets that is inclined from the first direction, sequentially increases by a half of a vertical resolution of the at least one light source in the circumferential direction,
   wherein the angle of inclination of each of the plurality of reflective facets is greater than or equal to zero,
   wherein the plurality of first prisms are disposed circularly around a center point of the steering unit, and
   wherein the steering unit further comprises a plurality of second prisms corresponding to the plurality of first prisms, and disposed outside of the plurality of first prisms.

2. The optical scanner of claim 1, wherein the at least one light source comprises a laser diode configured to emit a laser beam.

3. The optical scanner of claim 1, wherein the steering unit is further configured to change a traveling path of the light emitted from the at least one light source into the first direction based on a rotation of the plurality of first prisms.

4. The optical scanner of claim 1, wherein at least two of the plurality of first prisms comprise output facets having different angles of inclination, and output facets of first prisms disposed at symmetrical locations with respect to the center point of the steering unit have a same angle of inclination.

5. The optical scanner of claim 4, wherein at least two of the plurality of second prisms comprise a plurality of output facets having different angles of inclination.

6. The optical scanner of claim 5, wherein second prisms disposed at symmetrical locations with respect to the center point among the plurality of second prisms have a same angle of inclination.

7. The optical scanner of claim 1, further comprising a reflective member configured to reflect the light output from the steering unit to the polygon mirror.

8. The optical scanner of claim 1, wherein the second direction is perpendicular to the first direction.

9. The optical scanner of claim 1, wherein a minimum angle of inclination of a reflective facet among the plurality of reflective facets is 0°.

10. The optical scanner of claim 1, further comprising:
    a first motor configured to rotate the steering unit around a first axis parallel to a traveling direction of the light emitted from the at least one light source;
    a second motor configured to rotate the polygon mirror around a second axis perpendicular to the traveling direction of the light emitted from the at least one light source; and
    a controller configured to independently drive each of the at least one light source, and independently drive the first motor and the second motor.

11. The optical scanner of claim 1, wherein the polygon mirror comprises at least two sub-polygon mirrors disposed symmetrically with respect to a plane parallel to a traveling direction of the light emitted from the at least one light source, and
    a pair of sub-polygon mirrors disposed symmetrically with respect to the plane among the sub-polygon mirrors have a same shape.

12. The optical scanner of claim 1, wherein the steering unit further comprises a first steering unit and a second steering unit, and the first steering unit and the second steering unit are disposed at two sides of the polygon mirror, respectively.

13. A light detection and ranging (LIDAR) system comprising:

the optical scanner of claim 1, the optical scanner being configured to scan an object based on light; and a detector configured to receive light reflected from the object.

14. The LIDAR system of claim 13, wherein the steering unit is further configured to change a traveling path of the light emitted from the at least one light source in the first direction based on a rotation of the plurality of first prisms.

15. The LIDAR system of claim 13, wherein the detector is disposed at a location where the light reflected from the object is directly received.

16. The LIDAR system of claim 13, wherein the detector is disposed at a location where light which is reflected from the object, incident on a reflective facet of the polygon mirror, and reflected from the reflective facet is received, and the reflective facet to which the light reflected from the object is incident is the same as a reflective facet configured to reflect the light emitted from the at least one light source to the object.

* * * * *